(12) United States Patent
Edwards et al.

(10) Patent No.: US 9,795,990 B2
(45) Date of Patent: *Oct. 24, 2017

(54) ENCLOSING MATERIALS IN NATURAL TRANSPORT SYSTEMS

(75) Inventors: David A. Edwards, Boston, MA (US); Raphaël Haumont, Longpont sur orge (FR); Francois Azambourg, Clichy (FR)

(73) Assignee: Incredible Foods, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/580,629

(22) PCT Filed: Feb. 22, 2011

(86) PCT No.: PCT/US2011/025764
§ 371 (c)(1),
(2), (4) Date: Nov. 5, 2012

(87) PCT Pub. No.: WO2011/103594
PCT Pub. Date: Aug. 25, 2011

(65) Prior Publication Data
US 2013/0045246 A1 Feb. 21, 2013

Related U.S. Application Data

(60) Provisional application No. 61/306,881, filed on Feb. 22, 2010, provisional application No. 61/385,103, filed on Sep. 21, 2010, provisional application No. 61/385,056, filed on Sep. 21, 2010.

(51) Int. Cl.
| | |
|---|---|
| *A23P 1/08* | (2006.01) |
| *A23L 2/00* | (2006.01) |
| *A61K 9/00* | (2006.01) |
| *A23L 1/00* | (2006.01) |
| *B05D 3/00* | (2006.01) |
| *A23P 10/30* | (2016.01) |
| *A23P 20/10* | (2016.01) |
| *A23P 20/17* | (2016.01) |
| *A23P 20/20* | (2016.01) |
| *A23P 20/25* | (2016.01) |
| *A23L 29/256* | (2016.01) |
| *A23P 20/15* | (2016.01) |

(52) U.S. Cl.
CPC ............ *B05D 3/002* (2013.01); *A23L 29/256* (2016.08); *A23P 10/30* (2016.08); *A23P 20/105* (2016.08); *A23P 20/15* (2016.08); *A23P 20/17* (2016.08); *A23P 20/20* (2016.08); *A23P 20/25* (2016.08); *B05D 2350/60* (2013.01); *B05D 2401/20* (2013.01)

(58) Field of Classification Search
None
See application file for complete search history.

(56) References Cited

U.S. PATENT DOCUMENTS

| | | | |
|---|---|---|---|
| 3,752,678 | A | 8/1973 | Jenkinson et al. |
| 4,695,466 | A | 9/1987 | Morishita et al. |
| 4,985,263 | A | 1/1991 | Klug et al. |
| 6,099,876 | A | 8/2000 | Nussinovitch |
| 6,627,236 | B1 | 9/2003 | Barbeau et al. |
| 8,852,335 | B2 * | 10/2014 | Tolibas-Spurlock et al. .............. 106/618 |
| 2007/0082094 | A1 | 4/2007 | McClements et al. |
| 2007/0160722 | A1 | 7/2007 | Best et al. |
| 2008/0247684 | A1 | 10/2008 | Binks et al. |

FOREIGN PATENT DOCUMENTS

| | | |
|---|---|---|
| AU | 2011217780 B2 | 8/2011 |
| FR | 2 785 265 | 5/2000 |
| GB | 1 564 452 | 4/1980 |
| JP | 53-133648 | 11/1978 |
| JP | 58-071876 | 4/1983 |
| JP | 58-071877 | 4/1983 |
| JP | S58-71877 | 4/1983 |
| JP | 59-131355 | 7/1984 |
| JP | 63-068047 | 3/1988 |
| JP | 63192352 | 8/1988 |
| JP | S63-192352 | 8/1988 |
| JP | 01-143827 | 6/1989 |
| JP | H01-313421 | 12/1989 |
| JP | 03-187347 | 8/1991 |
| JP | 04-222562 | 8/1992 |
| JP | H04-222562 | 8/1992 |
| JP | H07-48983 | 5/1995 |
| JP | 63-192352 | 8/1998 |
| JP | 2002-528103 | 9/2002 |
| JP | 2005-151827 | 6/2005 |
| JP | 2008-161817 | 7/2008 |
| JP | 2009-120571 | 6/2009 |
| WO | 96/28050 | 9/1996 |

(Continued)

OTHER PUBLICATIONS

BiopiaTM archvied product FAQ web page from Mar. 27, 2008. Retrieved from <https://web.archive.org/web/20080327234235/http://www.2wplastic.com/faq.htm>.*
Semba et al. (Journal of Applied Polymer Science vol. 101, Issue 3 (May 24, 2006).*
Jeon et al.; Photocrosslinked Alginate Hydrogels with Tunable Biodegradation Rates and Mechanical Properties; *Biomaterials*; vol. 30, No. 14, May 1, 2009; pp. 2724-2734.
International Preliminary Report on Patentability; PCT/US2011/025764; Aug. 28, 2012; 6 pp.

(Continued)

*Primary Examiner* — Patricia Duffy
*Assistant Examiner* — Garen Gotfredson
(74) *Attorney, Agent, or Firm* — McDermott Will & Emery LLP

(57) ABSTRACT

Edible or potable substances can be transported in biodegradable vessel.

20 Claims, 23 Drawing Sheets

(56) References Cited

FOREIGN PATENT DOCUMENTS

| WO | WO96/28050 | 9/1996 |
|----|------------|--------|
| WO | 2007/038621 | 4/2007 |
| WO | 2009106218 A1 | 9/2009 |

OTHER PUBLICATIONS

Extended European Search Report dated Jun. 25, 2014 from Corresponding European Application No. 14165698.3.
Vargas, M. et al., "Recent Advances in Edible Coatings for Fresh and Minimally Processed Fruits," Crit. Rev. Food Sci. Nutrition, 48:496-511 (2008).
Rojas-Grau, M. et al., "Apple Puree-alginate Edible Coating as Carrier of Antimicrobial Agents to Prolong Shelf-life of Fresh-cut Apples," Postharvest Biology and Technology, 45:254-264 (2007).
Oussalah, M. et al., "Antimicrobial Effects of Alginate-Based Film Containing Essential Oils for the Preservation of Whole Beef Muscle," J. Food Protection, 69(10):2364-2369 (2006).
YouTube video uploaded on Nov. 4, 2007, downloaded from https://www.youtube.com/watch?v=ML7KWw5n6cY on Aug. 12, 2014.
YouTube video uploaded on Mar. 29, 2010, downloaded from https://www.youtube.com/watch?NR=1&feature=endscreen&v=iHu4idQA7Rw on Aug. 12, 2014.
YouTube video uploaded on Jan. 4, 2010. downloaded from https://www.youtube.com/watch?v=6UaMR5MdskE on Aug. 12, 2014.
YouTube video uploaded on Feb. 5, 2008, downloaded from https://www.youtube.com/watch?v=gKWgmx0kc1A on Aug. 12, 2014.
YouTube video uploaded on Sep. 7. 2011, downloaded from https://youtube.com/watch?v=DQvYfMq0Qrs on Aug. 12, 2014.
Farris et al., Development of Polyion-Complex Hydrogels as an Alternative Approach for the Production of Bio-based Polymers for Food Packaging Applications: A Review, Trends in Food Science & Technology, 20:316-332 (2009).

* cited by examiner

Structure of alginate polymer -(M)$_m$-(G)$_n$ – (M: mannuronate: G: guluronate

Polymerization of sodium alginates via divalent cations (e.g. Ca$^{2+}$) [USTL Lille]

"Egg of water": pure liquid water is embedded in a fine jelly membrane of alginates.

Process developed to create an "egg of water" (see FIG. 3)

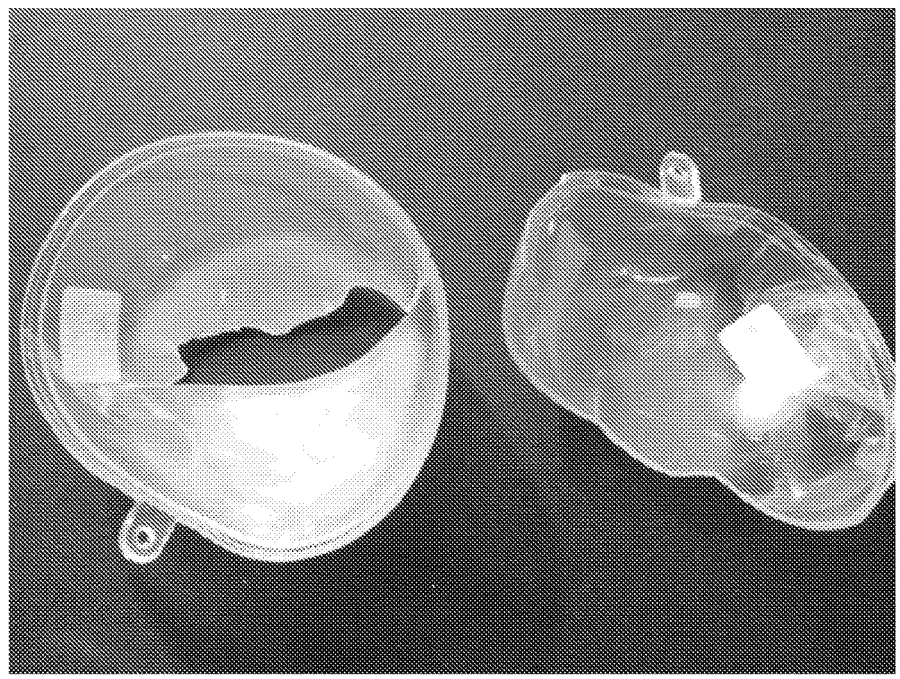
FIG. 5
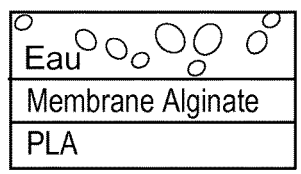
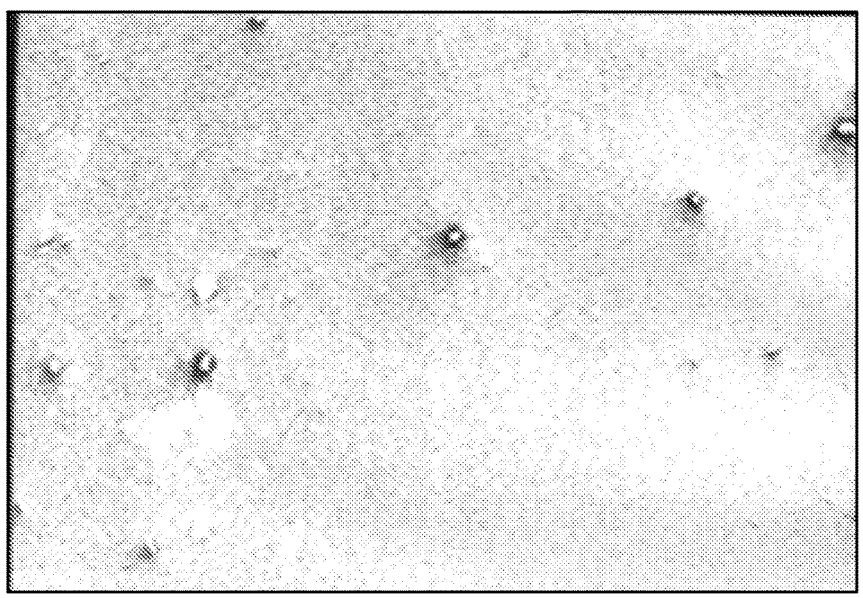
FIG. 6

Process developed to create a robust shell using chemically-modified alginates.

Liquid water embedded in gellan gum membrane (1mm).
Diameter of the sphere is 8 cm.
The sphericity is perfectly preserved.

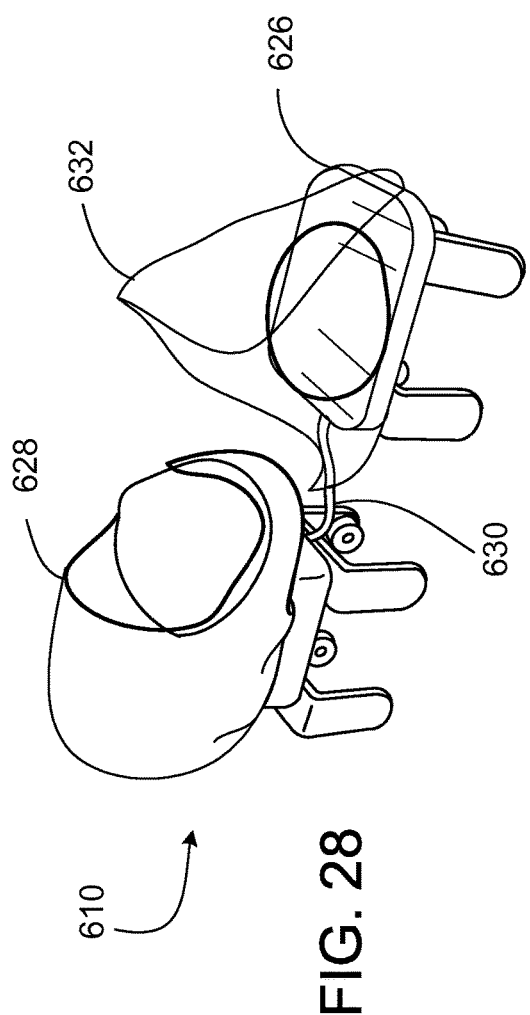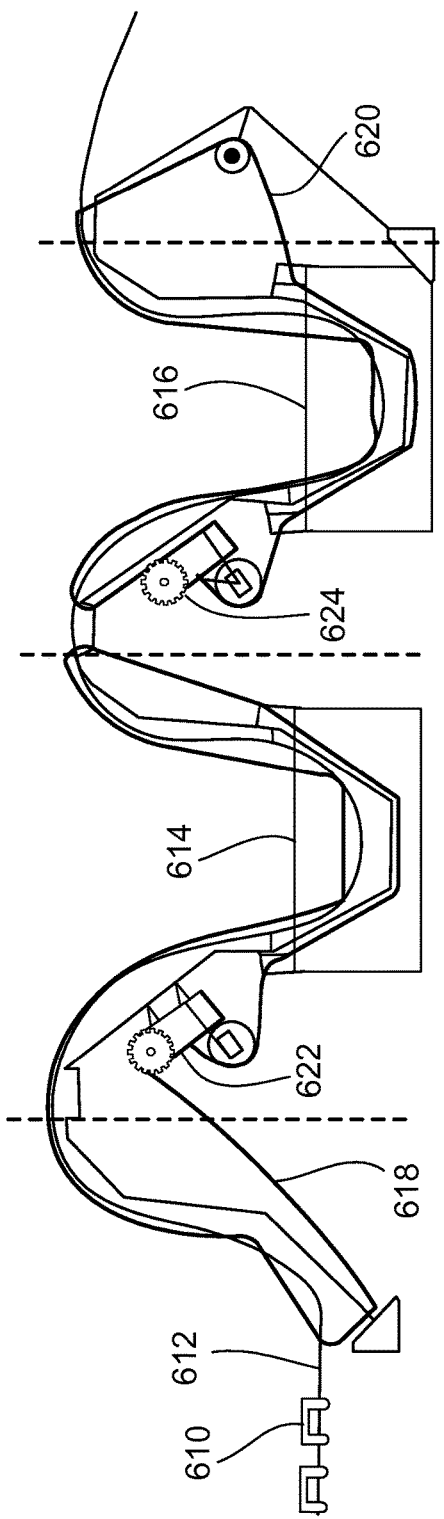

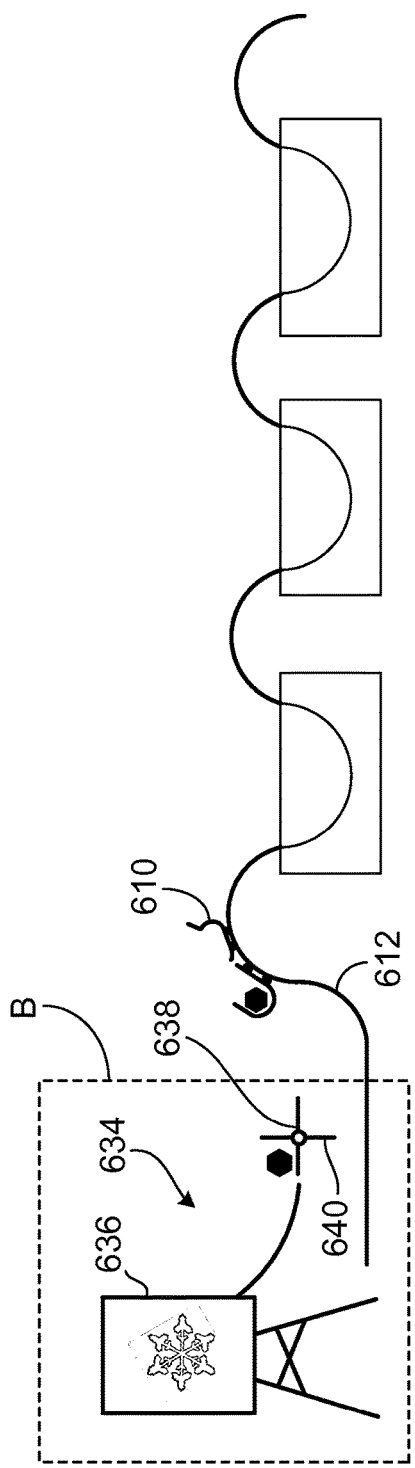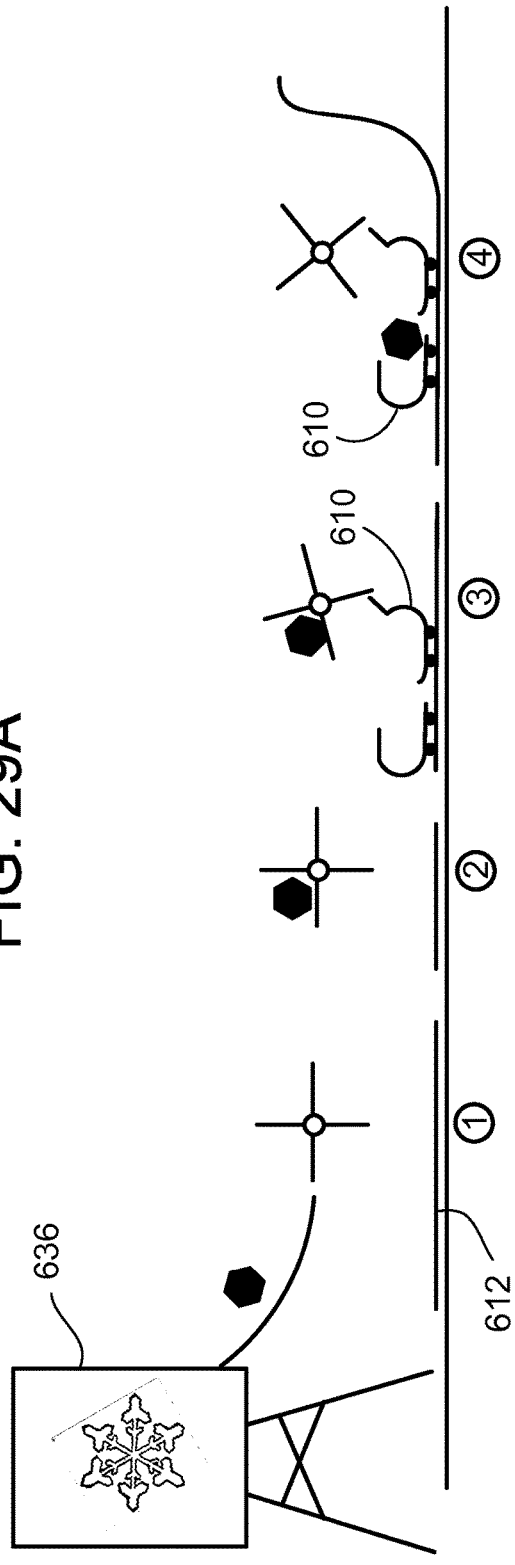
FIG. 29A
FIG. 29B

ENCLOSING MATERIALS IN NATURAL TRANSPORT SYSTEMS

CROSS REFERENCE TO RELATED APPLICATIONS

This application is a 371 National Stage of International Application No. PCT/US2011/025764, filed on Feb. 22, 2011, which claims priority to U.S. Provisional Applications Nos. 61/385,056 and 61/385,103, both filed on Sep. 21, 2010 and U.S. Provisional Application No. 61/306,881, filed on Feb. 22, 2010. The contents of the above applications are incorporated by reference in their entireties.

TECHNICAL FIELD

This invention relates to vessels for transporting materials, and more particularly to vessels for transporting fluids.

BACKGROUND

Mankind has filled, carried, and transported water and other liquids (as well as solids, emulsions, slurries, foams, etc.) in vessels made of pottery, glass, plastics and other materials since prehistoric times. While the nature of these vessels has evolved with advances in material manufacture and design, the basic principle of a vessel comprised of a container comprising a surface that encloses the liquid, either partially or completely, and from which the liquid can be removed, emptying the vessel, which can be refilled, has essentially not varied. Users continue to fill and empty containers with water and other liquids for various practical purposes.

SUMMARY

We have developed a new approach to transporting water and other materials that draws inspiration from nature. Our vessels for transporting liquids can have an external surface of the vessel that is intimately and uniquely associated with the liquid contained within the vessel, in the sense that the skin of a grape cannot be emptied of the grape contents, and filled back up again, or the skin of an orange peeled off the orange and filled up again. Oranges and grapes are two of nature's ways of transporting natural materials. We demonstrate that we can make vessels to carry water and other materials by human engineering and achieve many advantages over existing and historical human approaches for liquid transport.

Our "natural transport systems" have the advantage that when the systems are emptied of the liquid (or other material) contained within them, the system itself does not present a disposal challenge in the sense of an empty bottle, bucket, or vial. The external surface of our natural transport systems can be eaten and digested, or it can degrade in nature to biocompatible elements, as do the skins of grapes and oranges. Our natural liquid transport systems can be useful as water bottles, or other drinkable liquid bottles; as containers for cosmetics, agricultural products, pharmaceutical products, baby products; and as general approaches to culinary applications. They can contain liquids, gels, emulsions, foams, slurries, and even solid material.

One embodiment of our concept involves the encapsulation of liquid, such as water, in a sodium alginate gel membrane, as can be used in culinary applications not requiring the impermeability and stability properties needed for a general purpose liquid transport system. However, according to our concept, the sodium alginate gel encapsulated liquid (e.g., hardened/cured with calcium or magnesium, or any multi-valent cation) can then be encapsulated in another biodegradable membrane, possessing the necessary properties of impermeability and stability for the particular application, as with a cookie shell (for short- or medium-term stability) or a poly-lactic acid shell, covalently cross-linked methacrylated alginate membrane, or other similar process or material (for long-term stability). The natural transport system, prepared with or without the internal sodium alginate gel membrane, can be designed to possess the strength and impermeability needed for medium and long term storage and transport by selection of (depending on the specific system/process used) membrane and/or shell thickness, cross-linking density, shape, size, and other physical and chemical properties, as may be applicable. When it is time for use, the external membrane can be removed, as one removes an orange peel or an egg shell, and the internal liquid, possibly contained in a soft gel membrane (or cured/hardened gel membrane), can be used or consumed.

As used herein, impermeability can be used, for example, to indicate a general resistance to mass transport such that diffusion of liquid across the membrane does not allow a measurable volume reduction (e.g., more than 5%) of the container over a period of up to 1, 2 or 4 months in standard shelf conditions (e.g., ~25 degrees C. and no direct sunlight).

Another embodiment of our concept involves encapsulation of liquid, such as water, in a sodium alginate gel or gellan gum membrane, followed by deposition of calcium on the external membrane through contact of the membrane with calcium carbonate, calcium chloride, calcium lactate, etc. Calcium deposited on the membrane creates a cured/hardened membrane, and/or hard shell in the manner of an egg shell. Alternatively, the membrane may be made of natural food particles, whose charge properties are such that some mixture of particles, alginates (or other natural charged material) and multi-valent cation, such as calcium or magnesium, produce a stable membrane.

Our natural transport systems can be made of many different materials, and in various shapes and sizes. They can be made with rugged shells that contain liquids, emulsions, foams, slurries, or solids, and that contain inside one or more soft or hard membranes with liquid, emulsions, foams, slurries or solids inside the internal membranes. The external and internal membranes or shells can be imbued with particular taste or medicinal or other desired properties, e.g., to improve functionality of the material inside, and/or can have special properties to resist external stresses, such as delivered by temperature, humidity, physical shock, radiation or the like.

Other researchers have proposed biocompatible and/or biodegradable encapsulated vessels for basic research and for agricultural, food, cosmetic and medical industries. Micro particles are generally membrane (often polymer) encapsulated particles less than a millimeter in size. Macro particles are generally membrane (often polymer) encapsulated particles up to 20 millimeters in size. Culinary encapsulated objects are often larger than 20 millimeters in size but without properties of long-term stability and strength. Previous systems are not designed to transport relatively larger quantities of water or other materials. Our approach involves a new kind of encapsulated vessel that uses existing and new materials to provide macroscopic vessels for material transport with the properties of strength, stability, and biodegradability necessary to transport water and other materials as we presently and historically transport water and other materials in bottles, buckets, glasses and other classical vessels.

Certain methods for creating a droplet coated with a membrane are generally appropriate for droplets sufficiently small so that droplet formation can be substantially controlled by surface tension. For example, droplets formed at the end of a tube suspended in air, with a film material (e.g., alginate in water) produced in an annulus around a cylindrical water/air tube and opening. The alginate solution may spread over the surface of a spherical cap of the droplets formed at the orifice of the tube, pointing downward relative to gravity. As the droplet emerges from the tube coated with alginate, the alginate-coated droplet falls, under gravity, into a calcium chloride bath, where free calcium reacts with alginate and creates a solid membrane around the droplet of water. However, this method can be ineffective for coating larger droplets (e.g., droplets that have a dimension, such as a diameter, greater than about 1 cm). For example, the surface of a large droplet can break up when emerging from the tube, at moment of creation, since surface tension forces of a large droplet are less influential than gravity, preventing the formation of a regular spherical cap at the orifice of the tube. For at least this reason, surface tension methods may be useful for coating droplets less than a certain size, but may have limited applicability in producing larger coated droplets that may be useful, for example, in improving distribution and portability of liquid and/or improving biodegradability of the container and/or improving consumability of the container.

Methods for producing relatively large membrane-enclosed liquid droplets or objects (e.g., edible bottles) are described. The apparatuses and systems for implementing these methods are also described. In some embodiments, the methods described herein increase the size of membrane-enclosed liquid droplets as compared to membrane-enclosed liquid droplets formed by surface tension methods. For example, certain methods described herein can be used to create membrane-enclosed liquid droplets having volumes greater than the droplet size that can be supported across an orifice by surface tension forces acting overall in substantial opposition to gravity.

In some embodiments, methods for producing relatively large membrane-enclosed liquid droplets or objects (e.g., edible bottles) include:

a) creation of a membrane through reaction between two aqueous phases of chemical constituents (e.g., calcium or magnesium in water and natural food particles with alginate in water) prior to or simultaneously with formation of the droplet;

b) injection of liquid into the membrane; and c) introduction (e.g., extrusion) of the combined liquid and membrane material into a reactant medium.

In certain embodiments, an extruded droplet detaches from the extrusion material (the combined liquid and membrane material) to become an isolated, membrane-enclosed object such as, for example, an edible container. In some embodiments, a residence time of the droplet in the reaction medium is sufficient to allow hardening of the membrane. Additionally or alternatively, the edible container is rinsed/washed (e.g., in pure water) to remove reaction material. A drying process may be used to dry water from the membrane. In certain embodiments, an additional process may allow further modification/addition to the membrane/container. For example, the membrane/container may be coated in a lipid (e.g., bee's wax) to enhance the physical, protective, and/or aesthetic properties of the membrane/container.

The edible containers may be consumed directly. Additionally or alternatively, the edible containers are placed within biodegradable material (e.g., poly-lactic acid) to facilitate transport of the edible containers.

In some embodiments, a fluid enclosing system can facilitate the production of a large number of edible containers through, for example, continuous production of the edible containers (e.g., production of one container per minute).

In one aspect, a fluid delivery apparatus includes a first housing, a second housing, and flow controller. The first housing at least partially defines a first fluid passage extending from a first inlet portion to a first outlet portion. The second housing at least partially defines a second fluid passage extending from a second inlet portion to a second outlet portion, the second outlet portion in fluid communication with the first fluid passage. The flow controller is arranged along the first outlet portion and configured to direct the flow of fluid through the first outlet outlet portion to create discrete containers.

In another aspect, a reactor module includes a reservoir section, a transfer section, and a removal section. The reservoir section at least partially defines a volume for containing fluid. The transfer section is adjacent to the reservoir section, and the transfer section includes a first lock between the reservoir section and the transfer section. The removal section is adjacent to the transfer section, and the removal section includes a second lock between the transfer section and the removal section. The first lock is movable between a first position and a second position to control the flow of fluid from the reservoir section to the transfer section. The second lock is movable between a first position and a second position to control the flow of fluid from the transfer section to the removal section.

In still another aspect, a fluid enclosing system includes a first reactor, a fluid delivery apparatus, and an outlet conduit. The first reactor module includes a reservoir section at least partially defining a volume for containing fluid. The fluid delivery apparatus is coupled to the first reactor module to allow the transfer of fluid therebetween. The outlet conduit has a first end portion and a second end portion, the first end portion coupled to the first reactor module to allow the transfer of fluid therebetween.

Embodiments can include one or more of the following features.

In some embodiments, the second outlet portion is disposed along the first fluid passage, between the first inlet and the first outlet. In certain embodiments, at least a portion of the second housing is disposed substantially within the first housing. The first fluid passage can include an annulus defined between the first housing and the second housing.

In certain embodiments, the flow controller includes a movable element (e.g., a rotatable element) movable to direct (e.g., at least partially interrupt) a flow of fluid through the first outlet portion. In some embodiments, the movable element includes a planar surface, the movable element movable to move the planar surface into a position substantially perpendicular to a flow of fluid through the first outlet portion. The flow controller can include a stationary element and the movable element is in slidable engagement with the stationary element to shear the flow of fluid through the first outlet portion. The movable element and the stationary element can each be a disk. The center of the movable element can be substantially aligned with the center of the stationary element. The movable element can be movable about an axis extending through the center of the disk, substantially perpendicular to the planar surface of the disk.

The stationary element and the movable element can each be between about 1 cm to about 50 cm in diameter. The planar surface of the stationary element can define a substantially circular orifice extending through the stationary element. The first outlet portion can define an outlet orifice substantially coaxially aligned with the substantially circular orifice of the stationary element. The planar surface of the movable element can define a substantially kidney-shaped orifice extending through the movable element. The kidney-shaped orifice of the movable element can be arranged relative to the substantially circular orifice of the stationary element such that the kidney-shaped orifice and the circular orifice are alignable to allow substantially unobstructed flow therethrough during at least a portion of the movement of the movable element.

In some embodiments, a motor is coupled to the rotatable element, the motor operable to drive the rotatable element at a substantially constant speed.

In certain embodiments, the first outlet portion defines a first outlet orifice extending through the first housing and the second outlet portion defines a second outlet orifice extending through the second housing. The area of the first outlet orifice can be greater than the area of the second outlet orifice. The area of at least one of the first outlet orifice and the second outlet orifice can be adjustable. The area of the first outlet orifice can be between about 0.5 square cm and about 10 square cm. For example, the area of the first outlet orifice can be greater than about 1 cm. The area of the second outlet orifice can be between about 0.25 square cm and about 8 square cm. The surface tension of the second fluid on the second outlet orifice can be less than the force of gravity when the second outlet orifice is directed toward the ground.

In some embodiments, at least one of the first outlet portion and the second outlet portion is substantially frustoconical.

In certain embodiments, at least one of the first housing and the second housing includes an electrically polarizable material. In some embodiments, an electricity source is in electrical communication with the electrically polarizable material.

In some embodiments, the first inlet portion is configured to receive fluid from a first fluid source and the second inlet portion is configured to receive fluid from a second fluid source separate from the first fluid source.

In certain embodiments the first lock and the second lock are each movable relative to one another.

In some embodiments, the difference between the first position and the second position of the first lock is greater than the difference between the first position and the second position of the second lock.

In certain embodiments, the reservoir section is configured to support a fluid delivery apparatus adjacent to the volume for containing fluid. The reservoir section can be configured to support the fluid delivery apparatus along a bottom portion of the volume for containing fluid when the volume contains fluid. Additionally or alternatively, the reservoir section can define a first receiving orifice, with the reservoir section configured to receive fluid through the first receiving orifice in a direction opposite to gravity.

In some embodiments, the reservoir section defines a second receiving orifice substantially opposite the first receiving orifice. The second receiving orifice can be configured to releasably engage a conduit. Additionally or alternatively, the reservoir section can define a third receiving orifice substantially perpendicular to the first receiving orifice and the second receiving orifice.

In certain embodiments, the removal section defines an outlet orifice to allow fluid to drain from the removal section under the force of gravity during use.

In some embodiments, an outlet conduit has a first end portion and a second end portion, the first end portion coupled to the removal section at the outlet orifice. The outlet conduit can include at least one substantially cylindrical section. Additionally or alternatively, at least a portion of the outlet conduit coupled to the removal section is disposed along a substantially vertical axis. In certain embodiments, the outlet conduit defines a return orifice adjacent to the portion of the outlet conduit disposed along the substantially vertical axis. At least a portion of the outlet conduit coupled to the removal section can be disposed at an angle between about 20 degrees and about 60 degrees relative to horizontal. The second end portion of the outlet conduit can be configured to engage a second reactor module.

In certain embodiments, at least a portion of the reservoir section has a substantially rectangular cross section. At least a portion of the transfer section can have a substantially rectangular cross section. At least a portion of the removal section can have a substantially rectangular cross section.

In some embodiments, the reactor module has a substantially uniform cross-section extending from the reservoir section to the removal section.

In certain embodiments, the first reactor module further includes a transfer section and a removal section. The transfer section is adjacent to the reservoir section, the transfer section including a first lock between the reservoir section and the transfer section. The removal section is adjacent to the transfer section, the removal section including a second lock between the transfer section and the removal section. The distance between the fluid delivery apparatus and the removal section can be between about 25 cm to about 150 cm.

In some embodiments, the first lock is movable between a first position and a second position to control the flow of fluid from the reservoir section to the transfer section, and the second lock is movable between a first position and a second position to control the flow of fluid from the transfer section to the removal section.

In certain embodiments, the first end portion of the outlet conduit is coupled to the removal section.

In some embodiments, the fluid delivery apparatus includes a first housing and a second housing. The first housing at least partially defines a first fluid passage extending from a first inlet portion to a first outlet portion. The second housing at least partially defines a second fluid passage extending from a second inlet portion to a second outlet portion, the second outlet portion in fluid communication with the first fluid passage. The first outlet portion can define an exit orifice. The removal section of the reactor module can define a removal orifice. The removal orifice of the removal section can have an area greater than the area of the exit orifice of the first outlet portion of the fluid delivery apparatus.

In certain embodiments, the fluid delivery apparatus includes a flow controller arranged along the first outlet portion and configured to direct (e.g., at least partially interrupt) the flow of fluid from the first outlet section to the first reactor module. The flow controller can include a rotatable disk rotatable relative to the first outlet portion of the first fluid passage.

In some embodiments, the first fluid passage and the second fluid passage each extend substantially parallel to a vertical axis, with the first outlet portion above the first inlet portion and the second outlet portion above the second inlet portion.

In certain embodiments, the second end portion of the outlet conduit is coupled to a second reactor module and the outlet conduit is in fluid communication with the second reactor module. The second reactor module can be disposed below the first reactor module, and the second end portion of the outlet conduit can be coupled to a top portion of the second reactor module. In some embodiments, the second reactor module includes a reservoir section at least partially defining a volume for containing fluid and the second end portion of the outlet conduit is coupled to the reservoir section of the second reactor module.

In some embodiments, a pump is configured to move fluid from a fluid source to the reservoir section of the first reactor module. Fluid from the fluid source can be introduced to the reservoir section at a point above the fluid delivery apparatus.

In certain embodiments, the outlet conduit is in fluid communication with a return line configured to return fluid from the removal section to the fluid source.

In some embodiments, at least a portion of the reservoir section has a substantially rectangular cross-section.

In certain embodiments, the first reactor module has a substantially uniform cross-section along at least one axis.

In another aspect, a method includes flowing a first fluid toward a first outlet portion of a first passage at least partially defined by a first housing, receiving a second fluid into the first fluid in the first passage, the second fluid received from a second passage at least partially defined by a second housing, moving the combined flow of the first fluid and the second fluid out of the first outlet portion, and directing (e.g., at least partially interrupting) the flow of the combined flow of the first fluid and the second fluid through the first outlet portion.

In yet another aspect, a method includes moving a combined flow of a first fluid and a second fluid into a reservoir section of a first reactor module, exposing the combined flow of the first fluid and the second fluid to a first reaction liquid in the reservoir section to form a fluid container comprising a membrane substantially surrounding a fluid, moving the fluid container from the reservoir section to a transfer section of the reactor module, moving the fluid container from the transfer section to a removal section of the reactor module, and receiving the fluid container and the first reaction liquid into an outlet conduit.

Embodiments can include one or more of the following features.

In certain embodiments, the first outlet portion is substantially coaxial with the second passage.

In some embodiments, flowing the first fluid toward the first outlet portion includes moving the first fluid in a direction substantially opposite the direction of gravity.

In certain embodiments, receiving the second fluid into the first fluid from the second passage includes moving the second fluid in a direction substantially opposite the direction of gravity.

In some embodiments, the combined flow of the first fluid and the second fluid moves out of the first outlet portion in a direction substantially opposite the direction of gravity.

In certain embodiments, directing the flow of the combined first fluid and second fluid includes separating at least a portion of the combined flow of the first fluid and the second fluid from the combined flow of the first fluid and the second fluid.

In some embodiments, directing the combined flow of the first fluid and the second fluid includes periodic interruption of the flow.

In certain embodiments, directing the combined flow of the first fluid and the second fluid includes rotating a rotatable element relative to the first outlet portion. Rotating the rotatable element relative to the first outlet portion can include shearing the combined flow of the first fluid and the second fluid. Additionally or alternatively, rotating the rotatable element relative to the first outlet portion includes rotating a planar surface of a first disk relative to a planar surface of a stationary disk. The first disk can define a first orifice and the second disk can define a second orifice, the first orifice aligning with the second orifice to allow fluid flow therethrough during at least a portion of the rotation of the first orifice.

In some embodiments, the ratio of the flow of the first fluid to the flow of the second fluid is increased (e.g., based at least in part on partial interruption of the combined flow of the first fluid and the second fluid). Additionally or alternatively, increasing the ratio of the flow of the first fluid to the flow of the second fluid can include increasing the flow rate of the first fluid. In some embodiments, the ratio of the flow of the first fluid to the flow of the second fluid is increased during interruption (e.g., partial interruption, full interruption) of the combined flow of the first fluid and the second fluid.

In certain embodiments, an electrically polarizing surface is in fluid communication with the first passage and/or the second passage.

In some embodiments, at least one of the first fluid and the second fluid is a liquid. For example, the first fluid can include an alginate (e.g., sodium alginate). Additionally or alternatively, the second fluid is water.

In certain embodiments, the first fluid is pumped into the first passage from a first reservoir and the second fluid is pumped into the second passage from a second reservoir separate from the first reservoir.

In some embodiments, the membrane substantially surrounding the fluid includes an alginate.

In certain embodiments, moving the combine flow of the first fluid and the second fluid into the reservoir section of the first reactor module includes directing the combined flow of the first fluid and the second fluid.

In some embodiments, the first reaction liquid includes a calcium chloride solution.

In certain embodiment, the fluid container is exposed to a second reaction liquid in a second reactor module. The second reaction liquid can be water and/or bee's wax.

In some embodiments, moving the fluid container to a transfer section of a reactor module includes pumping the first reaction liquid in the direction of the transfer section.

In certain embodiments, moving the fluid container to a transfer section of a reactor module includes introducing air bubbles into the first reaction liquid.

In some embodiments, moving the fluid container to the removal section of the reaction module includes placing a first lock between lock between the reservoir section and the transfer section such that the transfer section contains the fluid container and the first reaction liquid and removing a second lock between the transfer section and the removal section such that the fluid container and the first reaction liquid in the transfer section moves into the removal section.

In certain embodiments, receiving the fluid container and the first reaction liquid into the outlet conduit includes separating the fluid container from the first reaction liquid, moving the first reaction liquid to a return line in fluid communication with the reservoir section of the first reactor module, and directing the fluid container toward a second reactor module under the force of gravity.

In some embodiments, separating the fluid container from the first reaction liquid includes returning at least a portion of the separated first reaction liquid to the reservoir section of the first reaction module.

In certain embodiments, the fluid container is at least partially coated with polylactic acid. The partial coating of the fluid container can include allowing the fluid container to move (e.g., under the force of gravity) into a shell including polylactic acid.

In some embodiments, the fluid container is substantially spherical with a diameter of about 0.25 cm to about 10 cm.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is photograph with a PLA shell without an inner calcium alginate membrane on the left and a PLA shell are separated from water by a calcium alginate membrane on the right.

FIGS. 6 and 7 show SEM images of the surface of two PLA shell surface after 30 days exposed to 45 degrees C. in the presence of water, respectively, with and without an inner calcium alginate membrane in contact with the PLA.

FIG. 27 is a side view of a system for coating objects to form natural transport systems.

FIG. 28 is a perspective view of the movable car for use with the system of FIG. 27.

FIGS. 29A and 29B are, respectively, a schematic of a system for coating objects to form natural transport systems and a series of schematics illustrating the loading module of the system shown in FIG. 29A in operation.

Like reference symbols in the various drawings indicate like elements.

DETAILED DESCRIPTION

Embodiments of our liquid transport system can have, e.g., varying shell or membrane thickness, chemistry, varying numbers of shells or membranes, multiple internal content materials, various shapes, various shell/membrane properties including taste and resistance. These and other embodiments of these vessels can be made at large scale, including with injection, spray drying, fluidized bed and other technologies.

Figure 1:
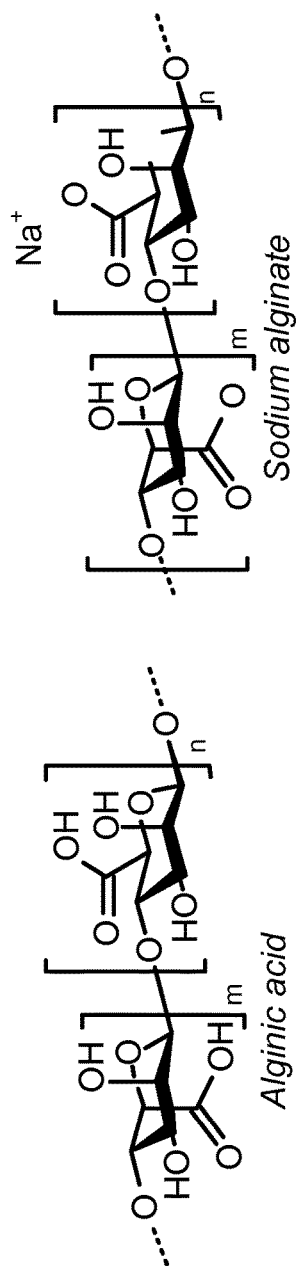
FIG. 1 shows the chemical structure of an alginate polymer -(M)m-(G)n- (M: mannuronate; G: guluronate).

Referring to FIG. 1, alginate (alginic acid) is an anionic polysaccharide, widely present in the cell walls of brown algae. It is a copolymer $-(M)_m-(G)_n-$, composed by mannuronate M (manurronic acid) and guluronate G (guluronic acid) monomers respectively (see FIG. 1). The values of m and n, the ratio m/n, and the space distribution between M and G (i.e. presence of consecutive G-blocks and M-blocks, or randomly organized blocks) all play key roles in the chemical and physical properties of the final copolymer.

Figure 2:
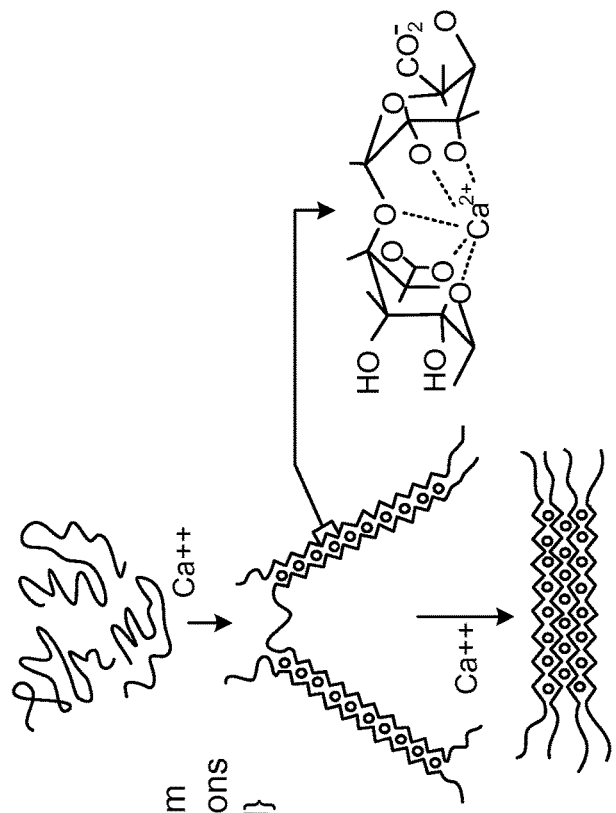
FIG. 2 illustrates polymerization of sodium alginates via divalent cations (e.g., $Ca^{2+}$).

Alginates are used in various applications, such as pharmaceutical preparations, impression-making materials (e.g., in dentistry and in prosthetics manufacturing), and in the food industry. Beyond their capability to easily form a gel, and their biocompatibility, alginates are also used for cell immobilization and encapsulation. Indeed, $Na^+$ can be removed and replaced by divalent cation (e.g., $Ca^{2+}$ or another multi-valent cation such as $Mg^{2+}$), inducing a more rapid gelation by electrostatic cross-linking (see FIG. 2).

Thus, in recent years, sodium alginates have found application in restaurants, e.g., to create spheres of liquid surrounded by a thin jelly membrane. Chefs such as Ferran Adria use this technique today to create "melon caviar," "false fish eggs" etc. by adding sodium alginates into a liquid (e.g., melon juice), then dropping the preparation in a calcium bath (calcium lactate or calcium chloride). Two parameters remain difficult to optimize or control: (i) the size of the spheres; and (ii) the texture of the liquid embedded in the membrane. The size of the spheres is problematic since, in known methods, the liquid falls in the calcium bath from a syringe or a straw, limiting the size of the sphere. Making a "giant" sphere is, so far, with current technology, a prohibitive challenge due to gravity forces ultimately overwhelming surface tension forces. In terms of texture, alginates can strongly increase the viscosity of the liquid. The increased viscosity can be required to stabilize and to form the jelly membrane more easily. However, the increased viscosity is not always pleasant while tasting and/or consuming the liquid, and the increased viscosity can mask aromas of the liquid.

Our approach involves a new kind of encapsulated vessel that uses existing and new materials to provide macroscopic vessels for material transport with the properties of strength, stability, and biodegradability necessary to transport water and other materials as we presently and historically transport water and other materials in bottles, buckets, glasses and other classical vessels. We have performed initial experiments to reduce our concept to practice.

Figure 3:
FIG. 3 illustrates a vessel in which liquid water is embedded in a fine jelly membrane of alginates.
Figure 4:
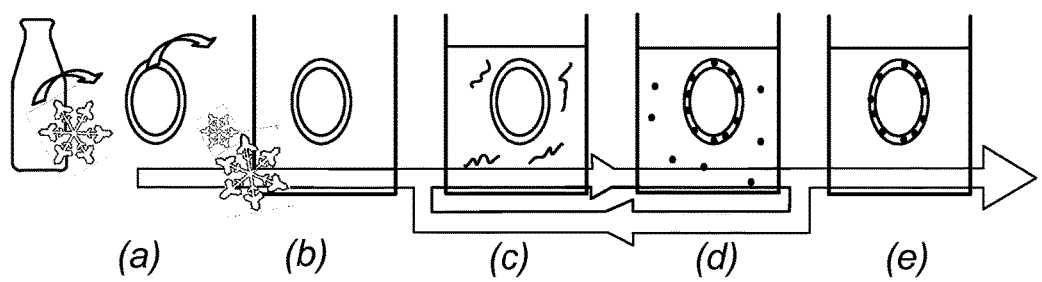
FIG. 4 illustrates a process to create the vessel of FIG. 3.

Example 1—Preparation of a Stable and Mechanically Robust Alginate Shell for Liquid Encapsulation As shown in FIG. 3, we obtained an "egg of water" (water was used as a reference liquid, but other liquids can also be used), by following the process described later and summarized in FIG. 4.

The exemplary process included the following steps:
(a) The liquid is frozen in the desired form
(b) The solid form is then further cooled in liquid nitrogen.
(c) The solid from step (b) is placed in sodium alginate solution. As the solid is very cold, alginates freeze on the surface. Thus, the thickness of the final jelly membrane is readily tunable.

Moreover, nitrogen liquid induces a "dried and cold" surface after the step (b), which is the reason alginates adhere easily on this surface. Through our experiments, we have discovered that the step (b) provides particularly improved results: in the case of the process of step (a) directly to step (c) (skipping step (b)), the solid in contact with the alginate solution at room temperature (approximately 20° C.) melts quickly on the solid surface, thus creating a liquid film between the solid and the alginate solution. Consequently, it is very difficult to stabilize a homogeneous membrane.

(d) After the desired time needed to achieve the desired thickness of the membrane, the membrane-covered solid is placed in calcium solution (e.g., calcium chloride solution), where gelation occurs.

After this step, it is possible, alternately, to place the calcium-coated solid in alginates, and then once again, to place the membrane-covered solid in calcium, step (c) to step (d), etc. Repeating this process produces a much thicker, harder, and more rigid shell.

(e) The membrane covered frozen solid is rinsed in water. The liquid within the calcium-coated membrane is allowed to melt gradually.

Example 2—Protective Effects of Inner Membrane

To demonstrate that a hard, external, biodegradable membrane can be protected from the water that it contains by the soft internal membrane, e.g. produced by calcium alginate, we produced outer shells of polylactic acid (PLA) and exposed them to either water or to water with a membrane of calcium alginate between the water and the PLA. We exposed the PLA shells, with and without the calcium alginate membranes, to 45 degrees C. external temperatures for 30 days and then observed the PLA shells afterward.

FIG. 5 shows that in the presence of water, and no calcium alginate membrane, the PLA shells (left side object) became opaque, reflecting a degradation of the PLA shell through contact with water. In contrast, the PLA shells are separated from water by a calcium alginate membrane (right side object), they remained transparent, indicating little or no degradation.

Figure 7:
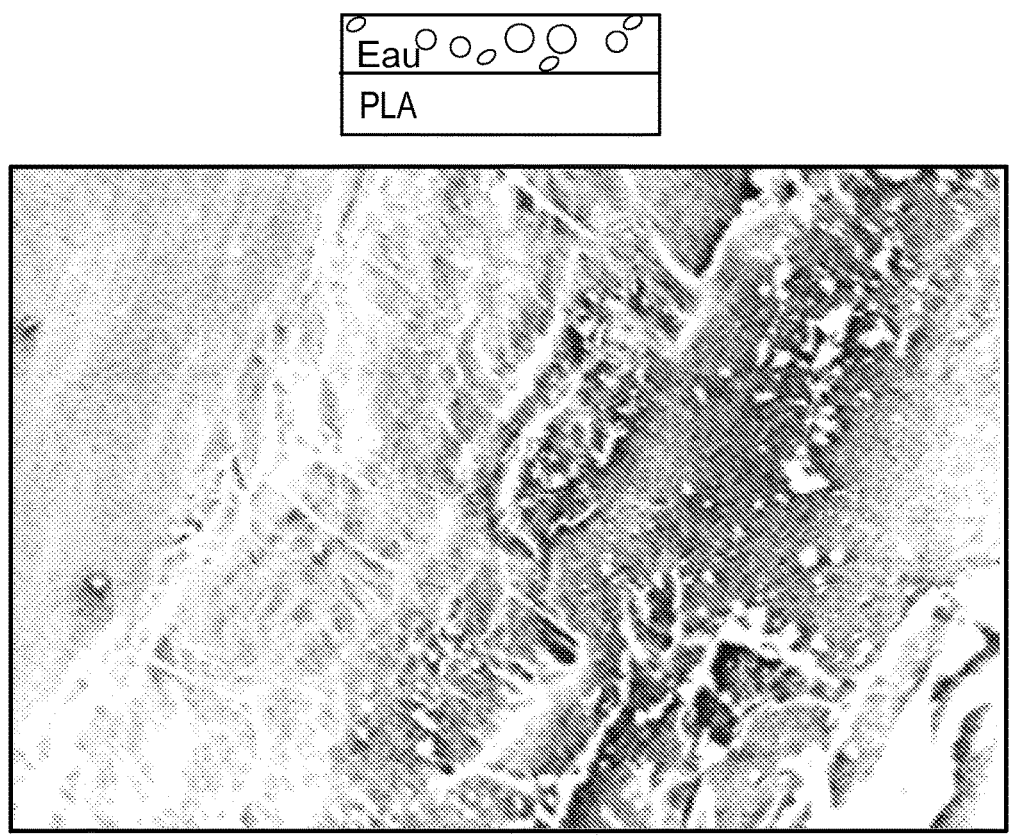
Figure 8A:
FIGS. 8A-8D show images of the spherical orange juice container inside the spherical polymeric shell (entire shell not shown to facilitate visibility), respectively, at the time of the creation of the two spherical juice containers, 20 hours after the creation of the spherical juice containers, 72 hours after creation of the spherical juice containers, and 184 hours after creation of the spherical juice containers.
Figure 8B:
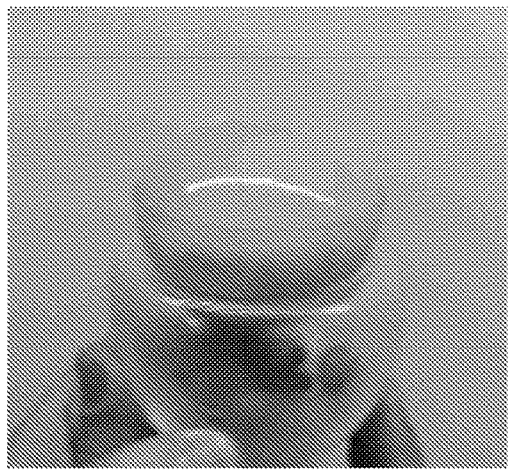
Figure 8C:
Figure 8D:
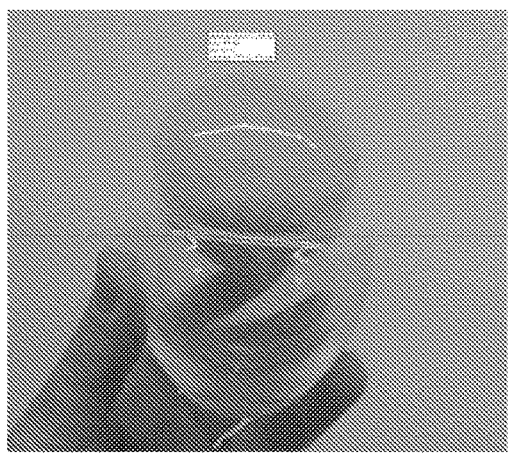
Figure 9A:
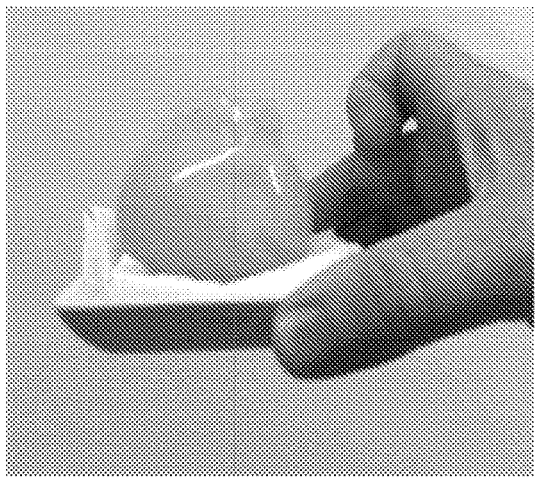
FIGS. 9A-9D show images of the spherical orange juice container without the spherical polymeric shell, respectively, at the time of the creation of the two spherical juice containers, 20 hours after creation of the spherical juice containers, 72 hours after creation of the spherical juice containers, and 184 hours after creation of the spherical juice containers.
Figure 9B:
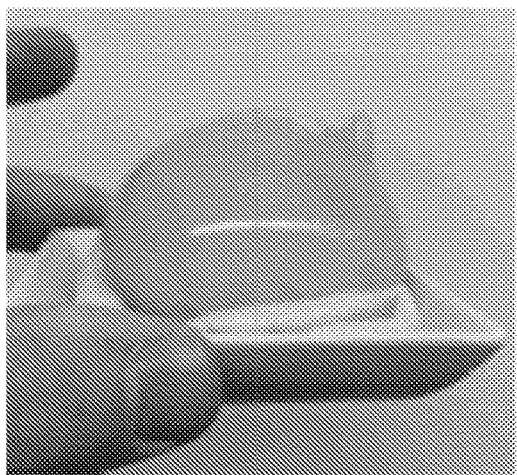
Figure 9C:
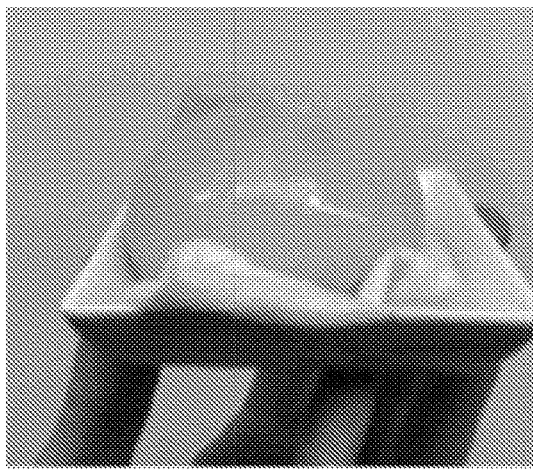
Figure 9D:
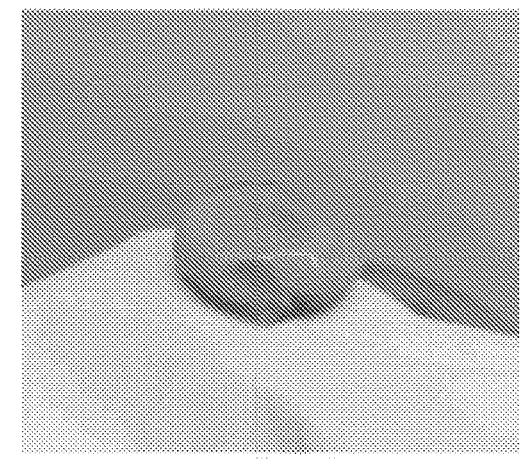

FIGS. 6 and 7 show SEM images of the PLA surface after 30 days exposed to 45 degrees C. in the presence of water with the calcium alginate membrane in contact with the PLA. The PLA surface in the presence of the alginate membrane (FIG. 6) is relatively smooth. In contrast, the surface of the PLA shell exposed to water without the intervening calcium alginate membrane is comparatively rough (see FIG. 7). This is understood to indicate that the calcium alginate membrane protects the PLA shell from degradation due to the presence of the internal liquid.

Example 3—Protective Effects of Outer Shell

To show that the outer rigid membrane furthermore protects the inner (e.g. calcium alginate) membrane from leakage and instability, we prepared alginate bottles with orange juice and placed these spherical containers of liquid either on a plate and napkin at −4 C or inside a hard polymeric shell formed of PLA. In some instances, other material can be used to form such shells.

FIGS. 8A-8D show images of the spherical orange juice container inside the spherical polymeric shell (shell partially removed for visibility), respectively, at the time of the creation of the two spherical juice containers, 20 hours after the creation of the spherical juice containers, 72 hours after creation of the spherical juice containers, and 184 hours after creation of the spherical juice containers. FIGS. 9A-9D show images of the spherical orange juice container without the spherical polymeric shell, respectively, at the time of the creation of the two spherical juice containers, 20 hours after the creation of the spherical juice containers, 72 hours after creation of the spherical juice containers, and 184 hours after creation of the spherical juice containers.

The series of figures show that the spherical alginate bottles deform over time and lose volume due to diffusion through the membrane and evaporation whereas the spherical alginate bottles in the polymeric shells do not lose shape or volume. This, in addition to the physical protection offered by the polymeric shells, reveals that, while the alginate membranes protect the PLA biodegradable shells from water damage (FIGS. 1, 2 and 3), the polymeric shells protect, as well, the alginate membranes (FIGS. 4, 5 and 6), thus the ideal edible and/or biodegradable bottle is formed by both the inner soft membrane (alginate in our example) and the outer strong biodegradable shell (PLA in our example). Neither the inner nor the outer alone are sufficient for the creation of ecologically safe bottles.

Example 4—Formation of a Rigid External Alginate Shell

In an alternate approach, chemically modified alginates were used to produce a rugged external membrane in place of the PLA outer shell. This approach provided the key advantages of long-term strength and stability by chemically cross linking the macroscopic shell with intermolecular covalent bonds in order to improve the mechanical properties.

Methacrylation of Alginate

Photocrosslinkable alginate macromers were prepared by reacting sodium alginate and 2-aminoethyl methacrylate in the presence of 1-ethyl-3-(3-dimethylaminopropyl)-carbodiimide hydrochloride and N-hydroxysuccinimide.

Experimental Protocol: The methacrylated alginate was prepared by reacting high molecular weight alginate (~300,000 g/mol) with 2-aminoethyl methacrylate (AEMA, Sigma). Methacrylated alginate with 50% theoretical methacrylation of uronic acid carboxylate groups was synthesized by dissolving high molecular weight sodium alginate (1 g) in a buffer solution (1% w/v, pH 6.5) of 50 mM 2-morpholinoethanesulfonic acid (MES, Sigma) containing 0.5 M NaCl. The N-hydroxysuccinimide (NHS, 1.3 g; Sigma) and 1-ethyl-3-(3-dimethylaminopropyl)-carbodiimide hydrochloride (EDC, 2.8 g; Sigma) (molar ratio of NHS:EDC=1:1.3) were added to the mixture to activate the carboxylic acid groups of the alginate. After 5 minutes, AEMA (2.24 g) (molar ratio of NHS:EDC:AEMA=1:1.3:1.2) was added to the product and the reaction was maintained at room temperature for 4 days. The mixture was precipitated with the addition of excess of acetone, dried under reduced pressure, and rehydrated to a 1% w/v solution in ultrapure deionized water (diH2O) for further purification. The methacrylated alginate was purified by dialysis against diH2O (MWCO 3500) for 3 days, filtered (0.22 mm filter), and lyophilized.

Preparation of a Calcium Alginate Hydrogel Shell

Spherical shaped frozen liquids were coated with a calcium alginate hydrogel shell. Frozen liquids were first coated with an aqueous solution of $CaCl_2$ before being exposed to 1% MA-alginate solution containing 0.1% photo initiator. Here again, this process can be repeated several times until the desired thickness of shell is reached. Immediately upon contact with $CaCl_2$, the MA-alginate solution absorbs calcium ions, which causes solidification of the entire shell suspension, resulting in a shape-retaining, spherical liquid container. The spherical container can then be rinsed several times in water to remove excess of MA-alginate and $CaCl_2$.

Final Process

Photocrosslinked and biodegradable alginate was engineered to further stabilize the shell formed by the calcium alginate hydrogel. Methacrylated alginate, which is the main component of the shell, was photocrosslinked by exposure to ultraviolet light for 20 minutes. The resulting modification serves to stabilize the shell morphology, thus reducing or eliminating deformation or destruction of the spherically-shaped macrocapsule.

Figure 10:
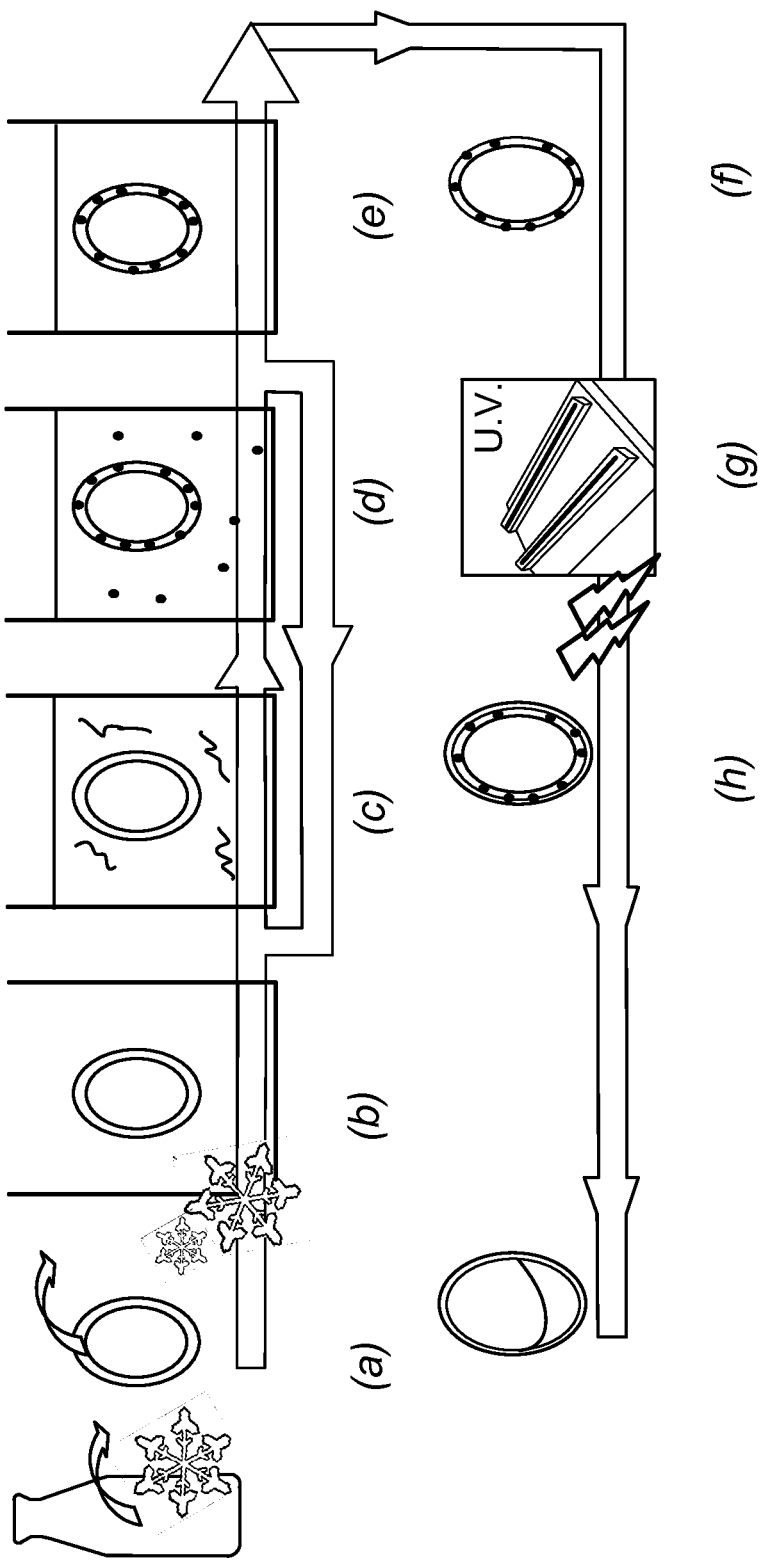
FIG. 10 illustrates a process to create a robust shell using chemically-modified alginates.

FIG. 10 schematically illustrates the process.

Figure 11:
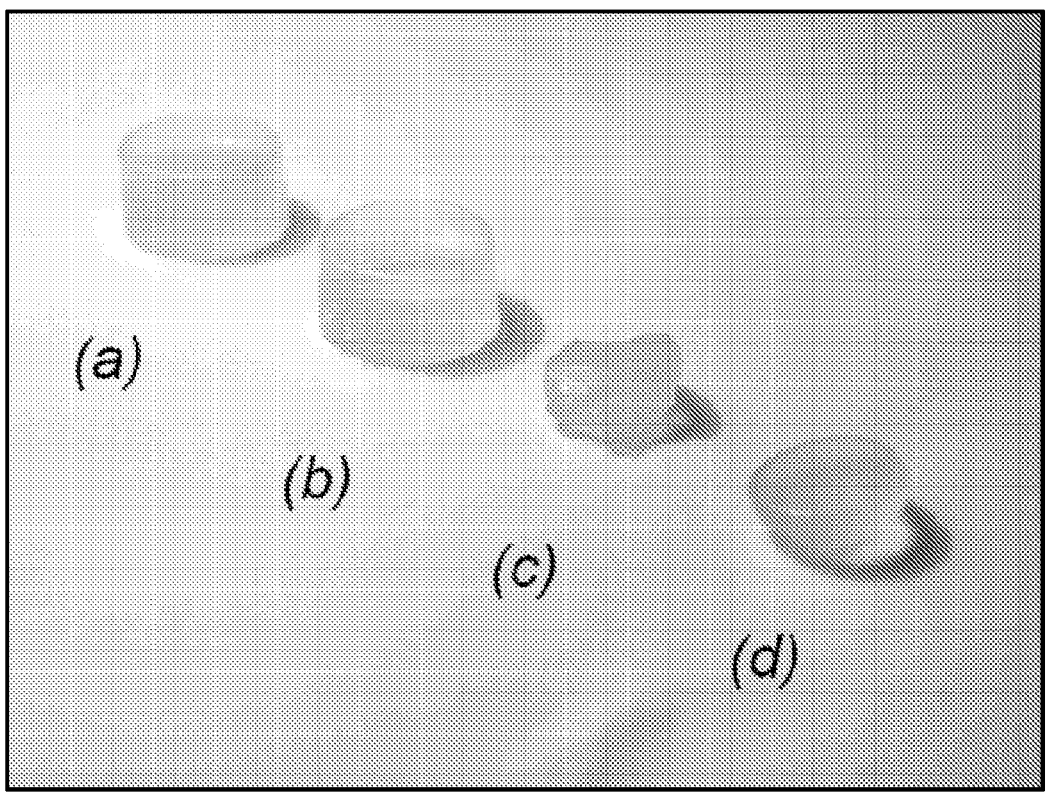
FIG. 11 illustrates vessels created using the process of FIG. 10.

Initial preliminary tests based on the process summarized in FIG. 5 performed using MA-alginate are depicted in FIG. 11 in which:

11(a) shows MA-alginate+photoinitiator; photo-treatment with ultraviolet light for 20 min;

11(b) shows MA-Alginate+photoinitiator; coated with an aqueous solution of $CaCl_2$;

11(c) shows MA-Alginate+photoinitiator; coated with an aqueous solution of $CaCl_2$; rinsed twice in water to remove excess $CaCl_2$; photo-treatment with ultraviolet light for 20 min; and 11(d): MA-Alginate+photoinitiator; frozen in liquid nitrogen in cylindrical shape; coated with an aqueous solution of $CaCl_2$; rinsed twice in water to remove excess $CaCl_2$; photo-treatment with ultraviolet light for 20 min.

After UV-treatment, we obtained a solid membrane in cases (a), (c) and (d). These results indicate that a photo-crosslinked alginate membrane can be successfully obtained through the described process described. A slight change of color of samples (a) (c) and (d) can be observed in comparison with the sample (b). This likely indicates that a chemical reaction occurs. The addition of $CaCl_2$ does not alter the results of the U.V. treatment. Freezing of MA-alginate and photoinitiator does not alter the results of the U.V. treatment. Freezing of MA-alginate and photoinitiator allows the preservation of specific shapes.

Initial observations indicate that sample (c) and (d) present the more solid mechanical membrane (in comparison with (a) and (b)). Mechanical physical measurements are underway to confirm this point.

Example 5—Preparation of a Stable and Mechanically Robust Gellam Gum for Liquid Encapsulation In one embodiment, we prepared a liquid transport and storage container with gellan gum modified by a calcium external shell. Gellan gum is also a polysaccharide, consisting of two residues of D-glucose and one of each residues of L-rhamnose and D-glucuronic acid. Gellan gum is produced by the bacterium *Sphingomonas elodea*. This polysaccharide is also considered a promising candidate, since (i) it is also a water-soluble polysaccharide and easy to use; (ii) the sol-gel transition occurs by heating/cooling thermal treatment (physical gelation) without using a chemical agent (such $Ca^{2+}$). Consequently, the process to form the initial volume is simpler than the step (d) in FIGS. 4-5; (iii) the gel is very stable, since it is able to withstand 120° C. heat (this $T_{gel}$ is higher than the agar-agar, carrageen or alginate value), making it especially useful in culturing thermophilic organisms for example; and (iv) contrary to alginates, the gel is mechanically very stable and rigid, and it keeps the form perfectively.

We have realized a sphere (8 cm diameter) composed with gellan gum membrane by two processes. The first process consists of placing the frozen liquid in a gellan gum hot solution. As the surface of the solid is cold, the gelation occurs suddenly. We can use liquid nitrogen to increase the thickness of the membrane. The solid volume is then extracted from the gellan solution. The solid melts slowly into a liquid, which is then embedded in a gellan membrane.

Figure 12:
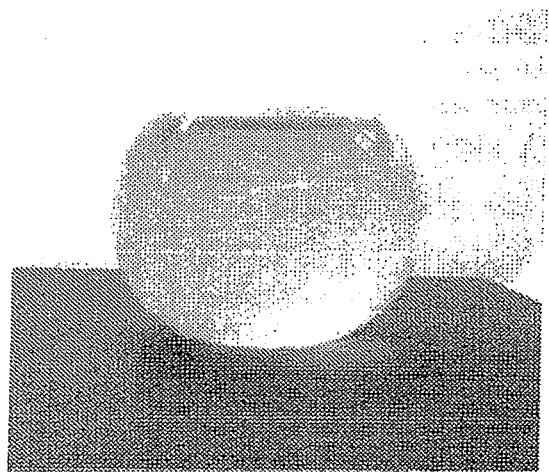
FIG. 12 illustrates liquid embedded in a gellan gum membrane.

The second process produces a smoother external surface, as follows (see FIG. 12):

(a) Gellan gum is dissolved in boiling water. A high concentration (>4% in mass) is required to get a robust membrane, which must compensate the weight of a high volume of liquid.

(b) While the gellan gum solution is still hot (i.e. $T>T_{gel}$), the liquid is introduced into a mould. (In our example, the mold has the form of two half spheres, which are then linked). This technique allows angles, and thus design of complex volumetric shapes.

(c) The temperature is decreased to below $T_{gel}$. The mold is removed. At the end of this step, we obtain a solid volume, empty (hollow) inside.

(d) The liquid (water for example) can be injected into the volume.

(e) The hole (caused by the syringe) is closed by using a hot ($T>T_{gel}$) needle.

From a culinary point of view, this process allows chefs to create a cocktail (cold or hot) wherein the glass (volume container) can be completely edible (and an integral part of the cocktail). Of course, it can be extrapolated towards many preparations, and this process can be extended to different fields of applications.

The next step is to chemically-modify the gellan gum to produce a rugged external surface (as done with the alginates in the example above). While it is possible to chemically modify gellan gum by methacrylation (as we did with alginate), and to photo polymerize the membrane, we chose here to reinforce the membrane by an in-situ crystallization in the gel. In this case, we immersed our gellan sphere in a concentrated carbonate solution ($Na_2CO_3$) and convected (e.g., heated) the solution past the sphere. Then, we immersed the gellan sphere in calcium solution ($CaCl_2$) and convected the solution again. In the gel, the crystallization of calcium carbonate occurs quickly: $Ca^{2+}+CO_3^{2-} \rightarrow CaCO_3$ ($K=4\times10^9$). This process allows us to build up a solid membrane of calcium carbonate as with an egg shell (i.e. particles of calcium carbonate particles are embedded in the gellan gel matrix). The external membrane becomes hard and resistive and can be made particularly thick with long convection (heating) exposure time of the calcium carbonate solution. The concentration of $CO_3^{2-}$ and $Ca^{2+}$ in solutions and time of immersion in batches are parameters to be controlled to obtain a rigid and inert membrane as in an egg shell.

Example 6—Food Particle-Containing Alginate Shells

The membrane can be designed to be stronger, thinner/thicker, or taste in a particular way, by adding suspended particles of food, e.g. chocolate, nuts, caramel, orange rind, or other particles at least partially insoluble in water. The particles can be sized (e.g., chosen or formed) such that the maximum dimension of the container formed by the membrane is about 50 or 100 times larger (or more) than the maximum dimension of the particles.

Figure 26:
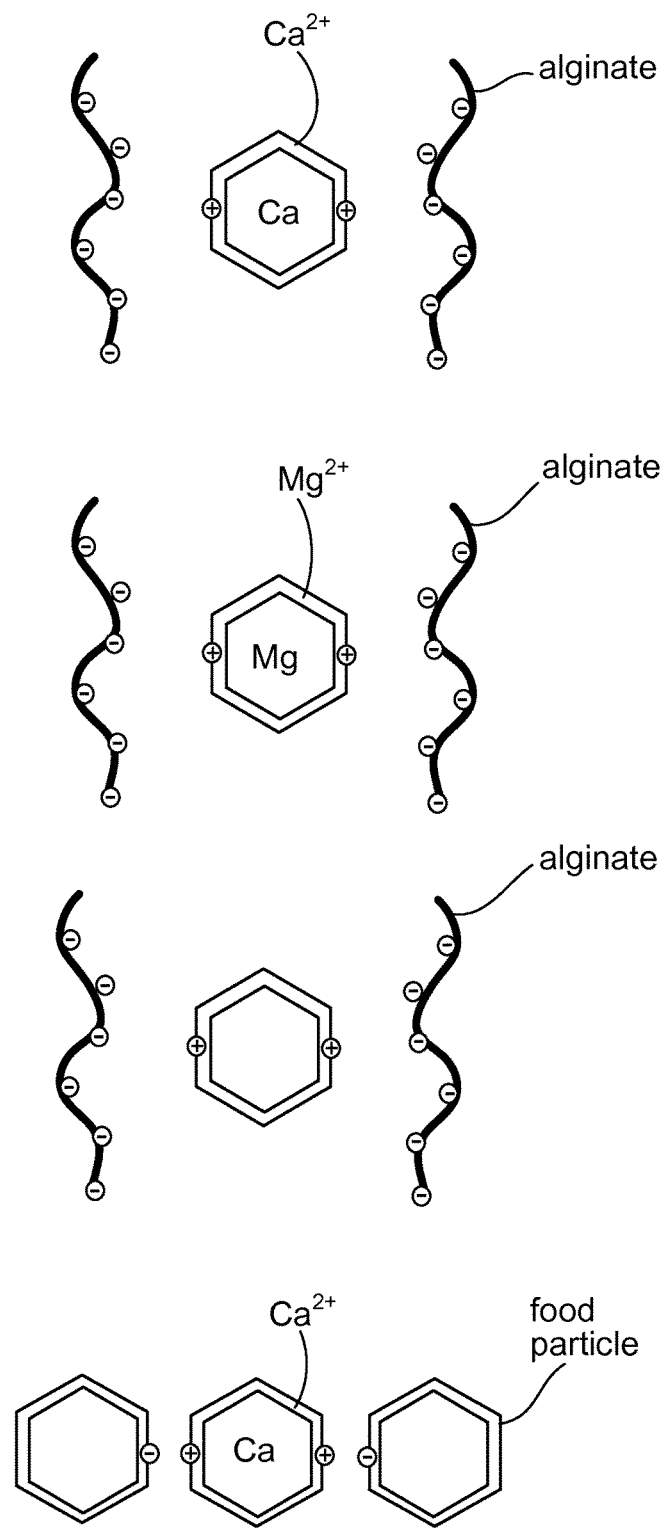
FIG. 26 is a schematic illustrating bonding between positive particles (e.g., Ca2+ or Mg2+) and negative particles (e.g., alginate or food particles).

Often these particles will be charged (i.e. most particle surfaces have some charge or zeta potential). This charge can be modified by the way each particle is created, its size, and the nature of the particle surface. Surfactants can be added to enhance the charged nature and the ionic atmosphere of the water can also be modified beneficially. When in alginate, or aqueous medium, these particles (assuming they are zwitter ionic or oppositely charged to the membrane forming material, such as the alginate) will undergo strong or weak associations with alginate but not so strong as to cause gel formation. When in contact with calcium, for example, particles will form with alginate a gelled membrane through interaction of the calcium and food particles trapped within the membrane, possibly strengthening it, improving flavor, etc. FIG. 26 schematically illustrates the interaction between positively charged particles (e.g., $Ca^{2+}$ or $Mg^{2+}$) with negatively charged alginate or food particles. The maximum weight of the added material (e.g., chocolate particles) relative to the alginate, might be quite large, i.e. far larger than 1:1 ratio of particles to alginate by mass. This will depend on the desired membrane nature as well as the nature of the particles and the interactions they may have with calcium and alginate.

These same methods can be extended to any kinds of small particles with a charge, thus creating a new class of membrane, formed by a charged polymer, such as alginate, and charged particles, with or without the addition of a multivalent cation such as calcium.

Chocolate-Containing Alginate Shells

Figure 13A:
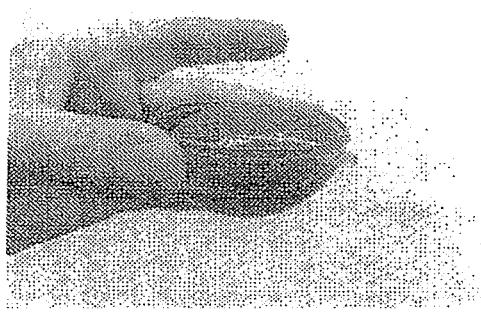
FIG. 13A-13C are photographs of orange juice contained in a calcium alginate membrane that includes chocolate.
Figure 13B:
Figure 13C:
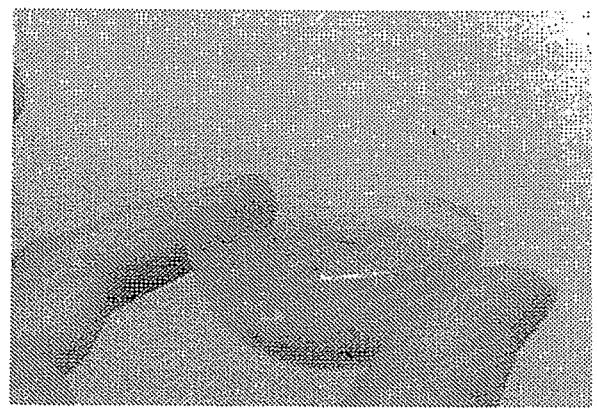

We demonstrated this concept by lowering the alginate concentration in water to 1.8% by weight and formed orange juice containers with membranes made with high, medium, and low concentrations of chocolate particles between about 0.1 and 5% chocolate particles by weight. The resulting membranes are shown in FIGS. 13A-13C, respectively.

Almond-Containing Alginate Shells

We also demonstrated this concept by forming containers with membranes made with alginate solutions with 6.4% food particles. The food particles included almond powder and, in some instances, various fruit powders. The almond powder had particles on the order of tens and hundreds of microns and was purchased retail in this form from the Vahiné food company in France. We formed containers with membranes made with alginate solutions with 6.4% food particles by dissolving/mixing 6.4 g ground almond powder into 100 g of an alginate solution (1.8% alginate). The alginate solution with almond powder produced a relatively opaque fluid (milky/creamy color), and maintains the fluidity of the original sodium alginate solution over time (at least 3-5 days). The almond combination seems to color and make fluid surrounding individual almond particles more opaque or at least translucent. In contrast, in the "sodium alginate solution+chocolate particles" membrane discussed above with respect to FIGS. 13A-13C, the chocolate particles, except when observing an individual chocolate particle directly, do not appear to produce a more generally opaque substance. The particle size, shape, and quantity all play integral roles in these phenomena.

We also formed containers with membranes made with alginate solutions with 6.4% food particles by dissolving 6.4 g ground coconut powder into 100 g of an alginate solution (1.8% alginate). The coconut pieces had small, generally crescent-like shapes with characteristic size on the order of hundreds of microns or several (1-3 or more) millimeters. The powder was purchased from Vahiné in France. The alginate solution with coconut powder maintains the fluidity of the original sodium alginate solution over time (at least 3-5 days). This mixture did not visibly have the effect of increasing overall opacity (beyond line-of-sight opacity of the coconut particles themselves) as seen in the almond mixture. By placing a high proportion of coconut powder into the alginate solution, opacity could be increased. Beyond a certain proportion of coconut particles in the mixture, however, the membrane ultimately was found to be more permeable when in container form, and at higher risk of leaking Particle size and shape may play an important role in the transparency, in particular as compared to the almond powder example noted above, since the coconut particles used were generally larger. There was little or no visible dissolution of coconut particles in the solution. It was also noted that when left to sit, the mixture of coconut pieces and alginate solution did not result in a substantial proportion of coconut pieces settling to the bottom. Such settling was found to be the case with many other food particles tested with alginate solution. The taste of the coconut membrane was found to relatively strong.

We also formed containers with membranes made with alginate solutions with 6.4% food particles by dissolving 4.0 g ground almond powder and 2.4 g ground lyophilized mango powder into 100 g of an alginate solution (1.8% alginate). This solution remained fluid for a certain time, but we noted that the fluidity had decreased considerably within roughly 50 hours. As such, we could still add additional mango powder to increase the fruit flavor, without losing too much fluidity. This mixture did not have the effect of increasing overall opacity as seen in the almond mixture. Particle size and shape may play an important role in the transparency, in particular as compared to the almond powder example noted above, as the mango particles used were larger, ranging from hundreds of microns to several millimeters, and had various non-uniform shapes.

We also formed containers with membranes made with alginate solutions with 6.4% food particles by dissolving 6.0 g ground almond powder and 0.4 g ground lyophilized raspberry powder into 100 g of an alginate solution (1.8% alginate). This combination produced a fluid that solidified relatively quickly (faster than the mango example), i.e. within a few (1-4) hours. It was noted that to a certain extent the (red) color of the raspberry spread throughout the fluid, making it translucent, even where solid raspberry particles were not present.

We also formed containers with membranes made with alginate solutions with 6.4% food particles by dissolving 6.0 g ground almond powder and 0.4 g ground lyophilized blackcurrant powder into 100 g of an alginate solution (1.8% alginate). This combination produced a fluid that solidified into a relatively hard gel fastest: 10 minutes to an hour. The fruit also somewhat colored the overall fluid to make it translucent.

Mixing dried fruit powders with the alginate solution, in particular raspberry and blackcurrant powders, produced relatively rapid "gelification", or a hardening of the fluid into a more solid gel. It is hypothesized that a property of the fruits tried or a substance contained within them, such as acidity/acids, plays a role in this gelification process, perhaps in effect replacing the cations provided by, for example, calcium chloride solution in other examples noted separately. It appears that blackcurrant is a more rapid "gelling agent" than raspberry, perhaps owing to greater acidity. It is possible that this gelling process obviates the need for other gelling components/steps such as with calcium chloride as described elsewhere.

These observations suggest that, in order to have a membrane with substantial fruit (e.g. raspberry or blackcurrant) flavor, it is sometimes useful to use many small aggregated "chunks" or "chips" of fruit powder, rather than a homogeneous mixture of alginate solution and fruit powder, to create individual, point-like flavorful fruit pieces within the membrane. In the mango example, slower hardening/gelification allowed for a greater amount of mango powder to be added, to enhance taste, without an immediate loss of fluidity. The chocolate particles used in other examples resulted in a less strongly flavored solution/membrane than many of the fruit combinations described here.

The relatively high opacity produced by the almond powder membrane, and the translucence/semi-opacity produced in other sample membranes, can be useful for aesthetic and/or culinary purposes. The size and shape of the particles in the various powders used likely plays an important role in the opacity/translucence of the solution. The almond powder, for example, was finer than previously used chocolate powders; this may help explain the increased opacity. The properties of the particles also likely play a role in the "strength" and/or permeability of the eventual container.

Food Particle Shells Containing Some Alginate

Natural food particles often have natural negative surface charges. Thus, edible bottles can be made of membranes comprised primarily of natural food particles, which can be mixed with alginate solutions (also negatively charged). We demonstrated this by making edible bottles with the following membrane compositions:

1) 15 g sodium alginate/60 g chocolate particles (formed by grating Lindt and other fine chocolate bars into small particles)/1 L water
2) 15 g sodium alginate/60 g coconut particles/1 L water
3) 15 g sodium alginate/60 g dried fruit (lemon, orange, cherry) particles/1 L water We also made similar membranes with smaller quantities of particles (5, 10, 15, 30 g) and greater quantities of particles (120 g) too.

We froze orange juice and other juices into ice cubes ("cube" defined in the general sense of any form reminiscent of an "ice cube" regardless of actual shape) and dropped these into liquid nitrogen for 15-30 seconds. We removed the ice cubes from the liquid nitrogen and placed the ice cubes in one of the solutions listed above for 15-30 seconds after which we removed the alginate/particle-coated ice cubes and placed them in solutions of 1.5% calcium chloride or magnesium chloride for 20 seconds-1 minute. After removing the ice cubes from the calcium or magnesium chloride solutions, we dropped them in a bath of water to rinse and then removed to allow the "edible bottles" to thaw completely. The results were orange juice (and other juices) contained within membranes of chocolate, coconut, and fruit particles integrated into the calcium-alginate membrane. These membranes proved relatively tasty and capable of preventing liquid from leaking from the bottle even when handled.

The high concentration of particles in the membranes reflects a charge-charge interaction between the calcium and magnesium divalent cations and the food particles (as between the divalent cations and the alginates). The food particles became an integral part of the cross-linked membrane. In contrast to previous work in which food particles coat calcium alginate membranes, this approach actually integrated the food particles within the membrane and reduced the mass of alginate in the membranes while increasing natural-particle mass.

Example 7—System for Enclosing Fluids in a Natural Transport System

Figure 15:
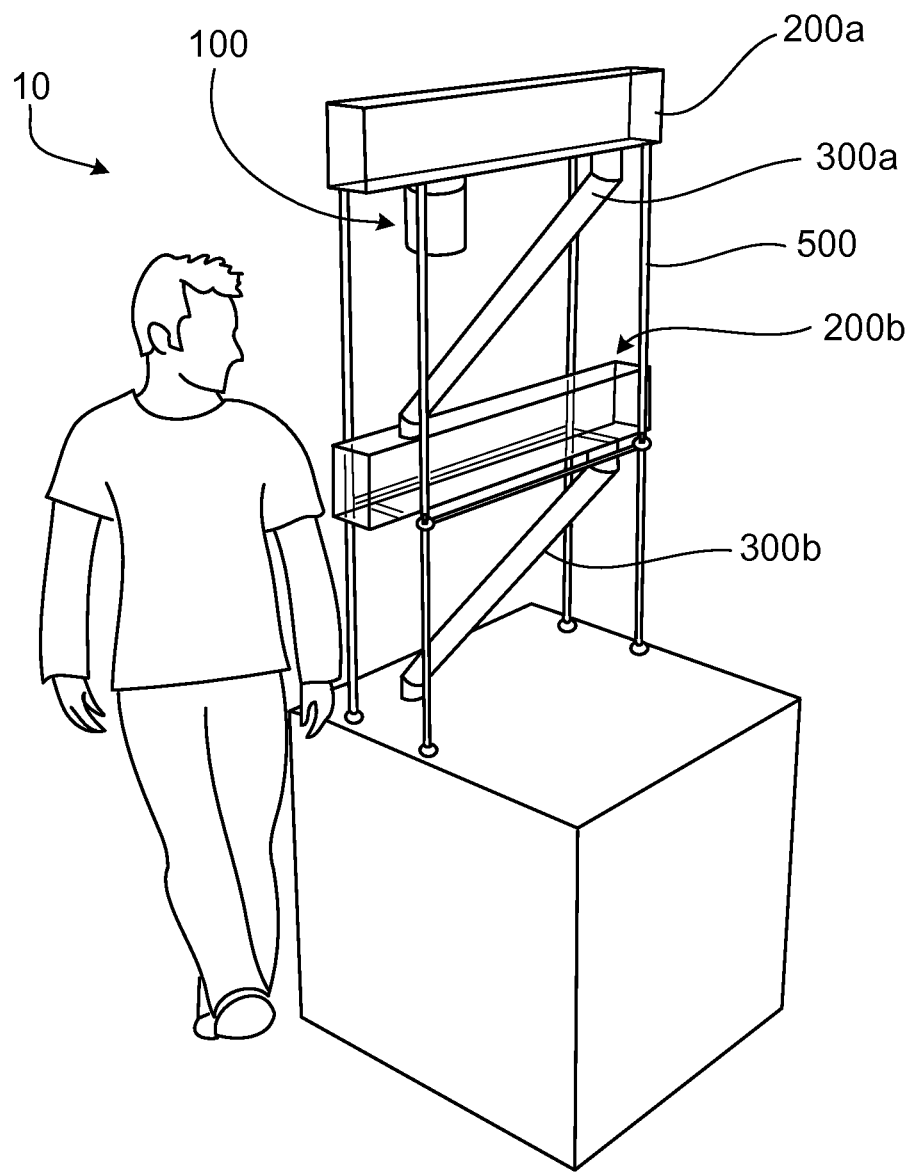
FIG. 15 is a schematic of an embodiment of a liquid enclosing system.

Referring now to FIG. 15, a fluid enclosing system 10 includes a fluid delivery apparatus 100, at least one reactor module 200, and at least one outlet conduit 300. The reactor module 200 is supported by a frame 500. As described in further detail below, the fluid delivery apparatus 100 is coupled to one end of the reactor module 200, and the outlet conduit 300 is coupled to another end of the reactor module 200. The reactor module 200 and the outlet conduit 300 are modular such that the fluid enclosing system 10 may include multiple reactor modules 200 in fluid communication with one another through a respective number of outlet conduits 300 extending therebetween. As used herein, reference numeral 200 refers to a reactor module and the addition of the a letter to the reference number refers to a particular reactor module. An analogous naming convention is used for the outlet conduit 300. For example, in the embodiment shown in FIG. 15, the fluid enclosing system 10 includes two reactor modules 200a and 200b in fluid communication with one another through an outlet conduit 300a extending therebetween. An outlet conduit 300b extends from the reactor module 200b to allow a fluid container to be retrieved. Additionally or alternatively, additional modules 200 may be added to the fluid enclosing system 10 (e.g., to add additional processing steps) by interconnecting the additional modules 200 with each other using additional outlet conduits 300.

As also described in further detail below, during use, the fluid delivery apparatus 100 moves a combined flow of a first fluid and a second fluid into the reactor module 200a, where the first fluid hardens into a membrane substantially surrounding the second fluid to form a fluid container. The fluid container moves (e.g., under the force of gravity) through the outlet conduit 300a and into the reactor module 200b, where the fluid container is rinsed. The rinsed fluid container moves through outlet conduit 300b and may be collected for distribution and/or consumption.

The first fluid and the second fluid may each include a liquid, a solution, a suspension, a colloid, and/or a gel. In certain embodiments, the first fluid is different from the second fluid. For example, the first fluid can include an alginate (e.g., sodium alginate) and the second fluid include water (e.g., pure water, fruit juice).

Figure 16:
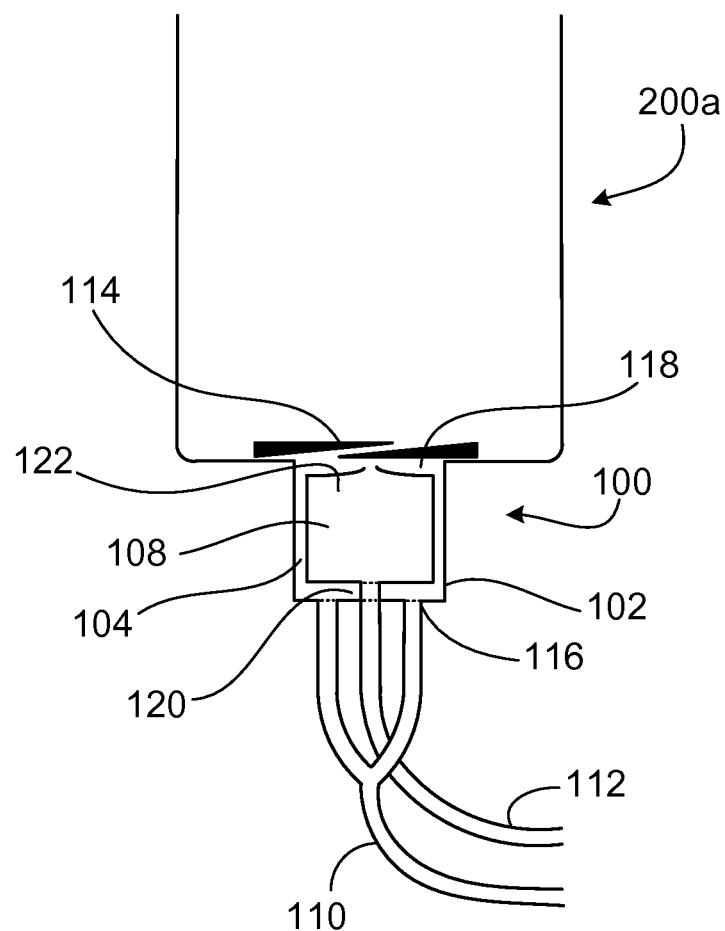
FIG. 16 is a cross-sectional view of a fluid delivery apparatus of the liquid enclosing system of FIG. 15.
Figure 17:
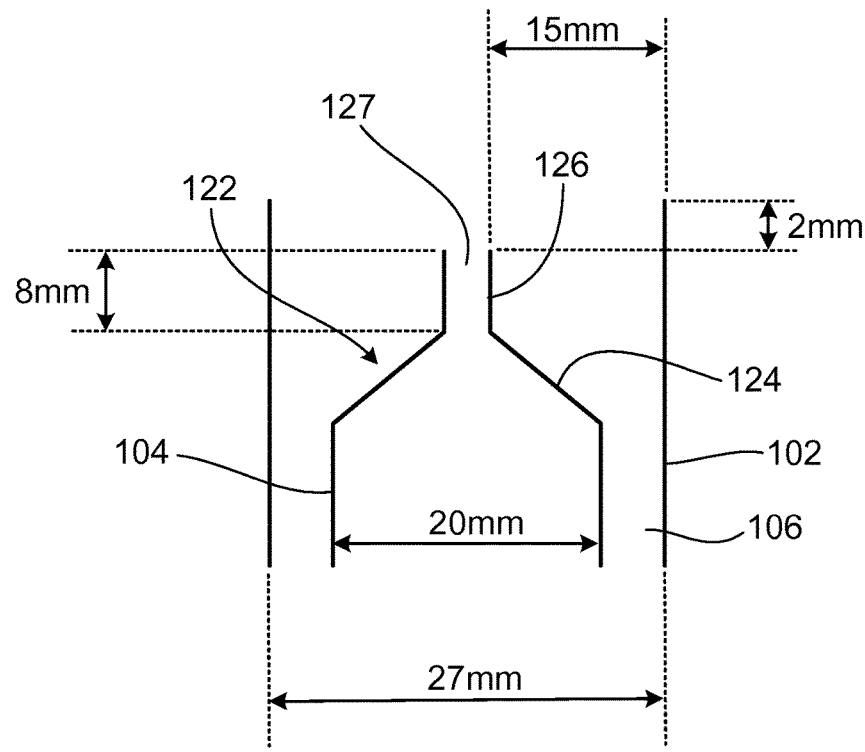
FIG. 17 is a partial cross-sectional view of the embodiment of the fluid delivery apparatus of FIG. 16.

Referring now to FIGS. 16 and 17, the fluid delivery apparatus 100 includes a first housing 102 substantially surrounding a second housing 104 and a flow controller 114 disposed at one end of the first housing 102. During use, a first fluid (e.g., an alginate) flows through the first housing 102 and a second fluid (e.g., water) flows through the second housing 104. The second fluid exits the second housing 104 into the first fluid in the first housing and both fluids move toward the outlet of the first housing 102, where the combined flow of the first and second fluid may be partially interrupted by the flow controller 114. In some embodiments, the first fluid and the second fluid flow through the respective first housing 102 and the second housing 104 in a direction substantially opposite to the direction of gravity.

The first housing 102 has a first inlet portion 116 and a first outlet portion 118. A first tubing 110 is disposed along first the inlet portion 116 and in fluid communication with the first housing 102 such that the first fluid is introduced into the first housing 102 through the first tubing 110. In some embodiments, the first housing 102 is substantially cylindrical and has a diameter of about 5 mm to about 50 mm (e.g., about 20 mm to about 30 mm). In certain embodiments, the first housing 102 has a substantially uniform cross section from the first inlet portion 116 to the first outlet portion 118.

The second housing 104 has a second inlet portion 120 and a second outlet portion 122. A second tubing 112 extends into the first housing 102 and into fluid communication with the second housing 104 such that the second fluid is introduced into the second housing 104 through the second tubing 112. In some embodiments, the second housing 104 is substantially cylindrical and has a diameter of about 10 mm to about 45 mm (e.g., about 15 mm to about 25 mm). The second outlet portion 122 of the second housing 104 includes a frustoconical section 124 and a tube 126. The decreased cross sectional area of the second housing 104 in the direction extending from the second inlet portion 120 to the second outlet portion 122 can, for example, increase the speed of the flow of the second fluid as it moves into the first fluid.

In some embodiments, pressures driving the two fluids can be independently controlled, for example, to control independently the speed of the first fluid moving through the first housing 102 and the speed of the second fluid moving through the second housing 104. For example, the pressure driving the two fluids can be independently controlled by changing the speed of a respective pump in fluid communication with the first housing 102 and the second housing 104.

In certain embodiments, the second outlet portion 122 defines an orifice 127 (e.g., a substantially circular orifice). In some embodiments, the surface tension forces on the second fluid at the orifice 127 are less than the gravitational forces on the second fluid when the second outlet portion 122 is pointed toward the ground.

The second housing 104 is disposed within the first housing 102 such that the space (e.g., annulus) between the inner portion of the first housing 102 and the outer portion of the second housing 104 defines at least a portion of a first fluid passage 106 extending from the first inlet portion 116 to the first outlet portion 118. The second housing 104 also defines at least a portion of a second fluid passage 108 extending from the second inlet portion 120 to the second outlet portion 122. The second outlet portion 122 terminates within the first fluid passage 106 such that fluid exiting from the second outlet portion 122 is injected into the first fluid in the first fluid passage 106. For example, the tube 126 of the second outlet portion 122 can terminate about 0.5 mm to about 10 mm (e.g., about 2 mm) upstream of the first outlet portion 118. The flow controller 114 is disposed adjacent to the first outlet portion 118 and upstream of the reactor module 200a. As described in further detail below, the flow controller 114 includes at least one movable element that can move to interrupt (e.g., at least partially block and/or shear) the combined flow of the first and second fluid moving from the first outlet portion 118 and into the reactor module 200.

Figure 18:
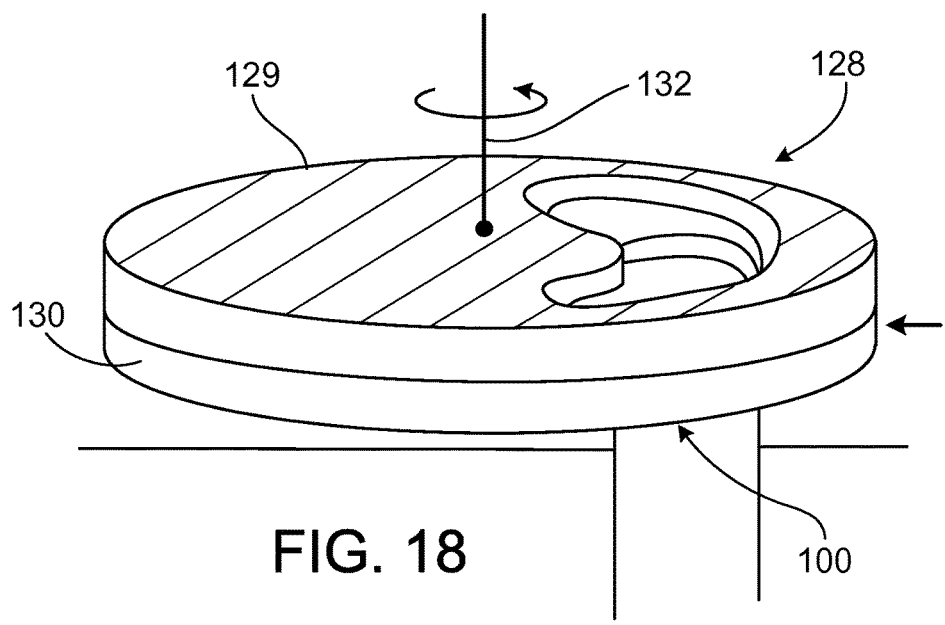
FIG. 18 is a perspective view of a flow controller of the fluid delivery apparatus of FIG. 16.
Figures 19A, 19B:
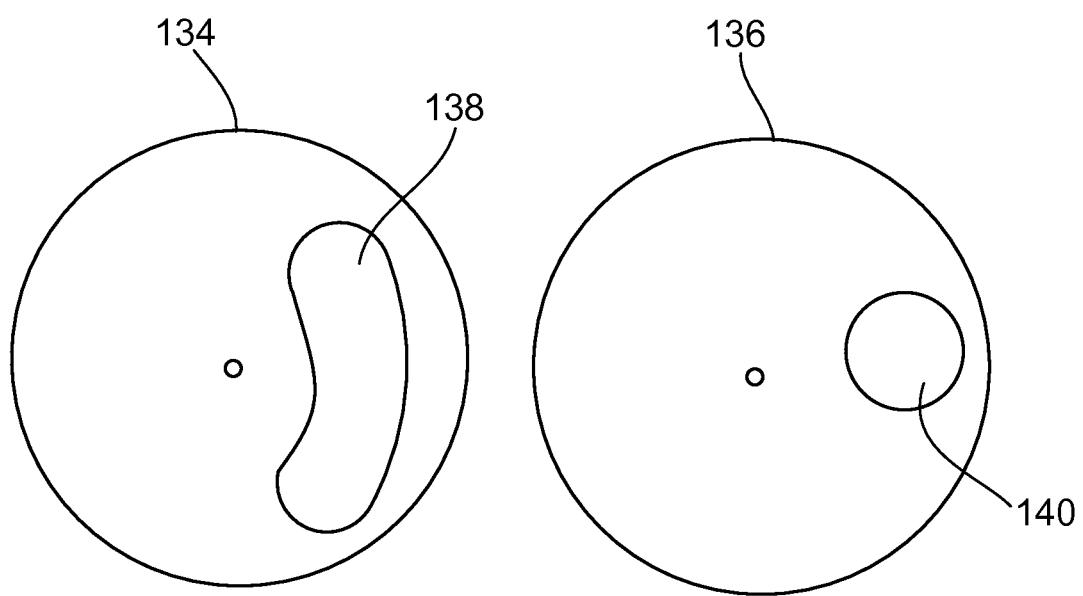
FIGS. 19A and 19B are top views of disks of the flow controller of FIG. 18.

Referring to FIGS. 18, 19A, and 19B, the flow controller 114 includes a rotatable element 134 and a stationary element 136 disposed within a housing 128 having a top portion 129 and a bottom portion 130. In certain embodiments, the top portion 129 is disposed adjacent to the reactor module 200a. An actuator 132 extends into the housing 128 (e.g., through the top portion 129 and/or through the bottom portion 130) and into mechanical communication with the rotatable element 134. During use, the combined flow of first fluid and second fluid from the first outlet portion 118 enters the housing 128 through the bottom portion 130, and the actuator 132 moves the rotatable element 134 relative to the stationary element 136 in the housing 128. As described in further detail below, the movement of the rotatable element 134 relative to the stationary element at least partially interrupts a substantially continuous flow of the combined first fluid and second fluid moving out of the top portion 130 of the housing 128.

The stationary element 136 defines a circular orifice 140 and is disposed toward the bottom portion 130 of the housing 128 such that the circular orifice 140 is adjacent to the first outlet portion 118 of the first housing 102. The stationary element 136 can be a disk having a diameter of about 3 cm to about 18 cm (e.g., about 9 cm). The planar surface of the disk may be oriented substantially perpendicular to the direction of flow of the combined first fluid and second fluid moving out of the first outlet portion 118.

The rotatable element 138 defines a substantially kidney-shaped orifice 138 and is disposed toward the upper portion 129 of the housing 128 such that the rotatable element 138 is adjacent to the reactor module 200a during use. The rotatable element 138 and the stationary element 136 are arranged relative to one another such that at least a portion of the kidney-shaped orifice 138 aligns with at least a portion of the circular orifice 140 as the rotatable element 138 moves through 360 degrees of rotation. Such alignment of the kidney-shaped orifice and the circular orifice 140 can allow substantially unimpeded flow from the first outlet portion 118 to the reactor module 200a. When the kidney-shaped orifice 138 and the circular orifice 140 are not aligned, the combined first fluid and second fluid accumulates in the first outlet portion 118. Additionally or alternatively, the relative movement of the kidney-shaped orifice past the circular orifice 40 can create a shear force sufficient to separate (e.g., slice) a portion of the combined flow of the first fluid and the second fluid from the remainder of the combined flow moving through the first outlet portion 118.

The movement of the kidney-shaped orifice 138 relative to the circular orifice 140 can be used to control the number of fluid containers created by the fluid enclosing system 10. For example, the actuator 132 can be a handle such that the movement of the kidney-shaped orifice 138 relative to the circular orifice 140 can be manually controlled. Additionally or alternatively, the actuator 132 can be a motor coupled to the rotatable element 134 such that the kidney-shaped orifice 138 moves past the orifice 140 at a substantially regular interval. The number of fluid containers created by the fluid enclosing system 10 can be controlled by controlling the motor speed.

In certain embodiments, the rotatable element 138 is the same overall size as the stationary element 136 to facilitate, for example, alignment of the rotatable element 128 and the stationary element 136. In some embodiments, the rotatable element 134 and/or the stationary element 136 can be a disk having a diameter of about 3 cm to about 18 cm (e.g., about 9 cm). The planar surface of each disk may be oriented substantially perpendicular to the direction of flow of the combined first fluid and second fluid moving out of the first outlet portion 118.

Figure 20:
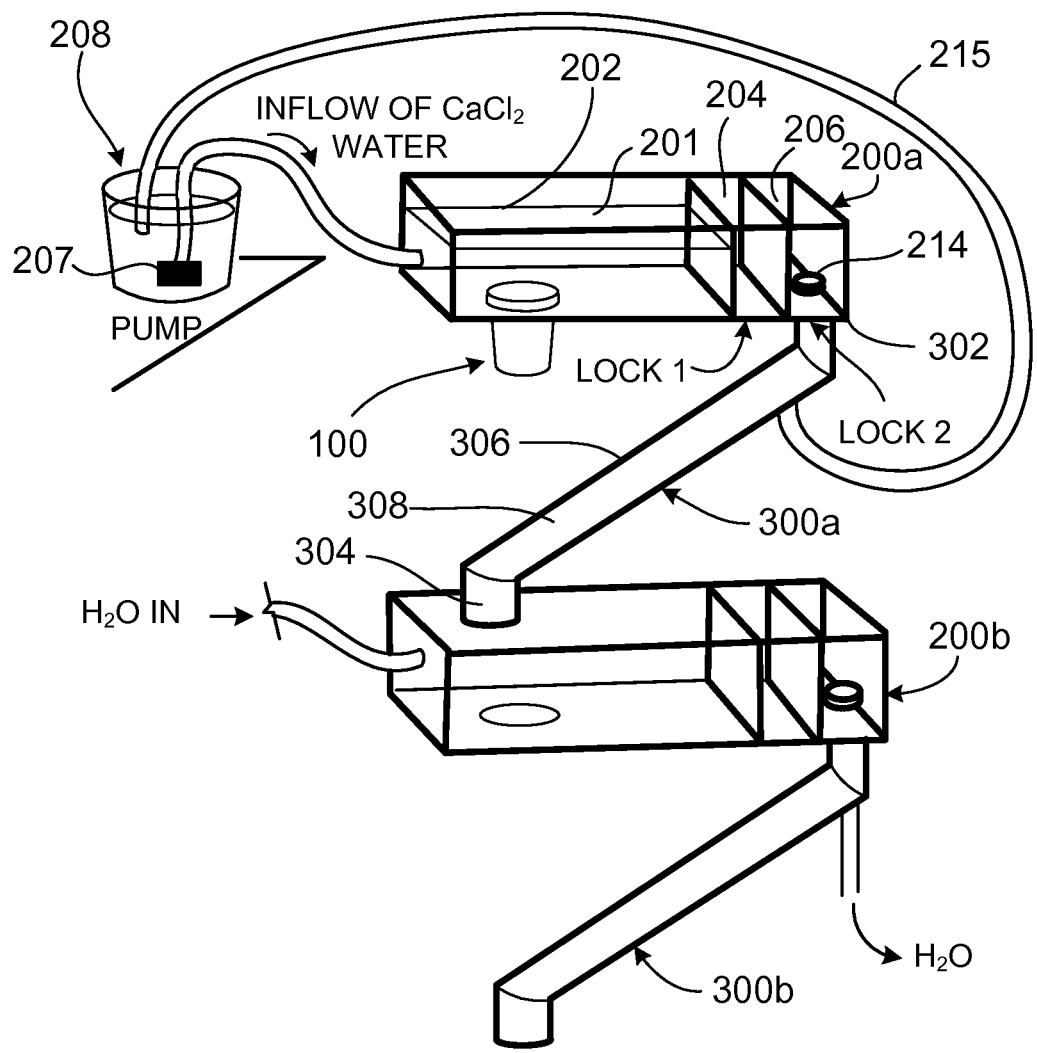
FIG. 20 is a perspective view of the liquid enclosing system of FIG. 15.
Figure 21:
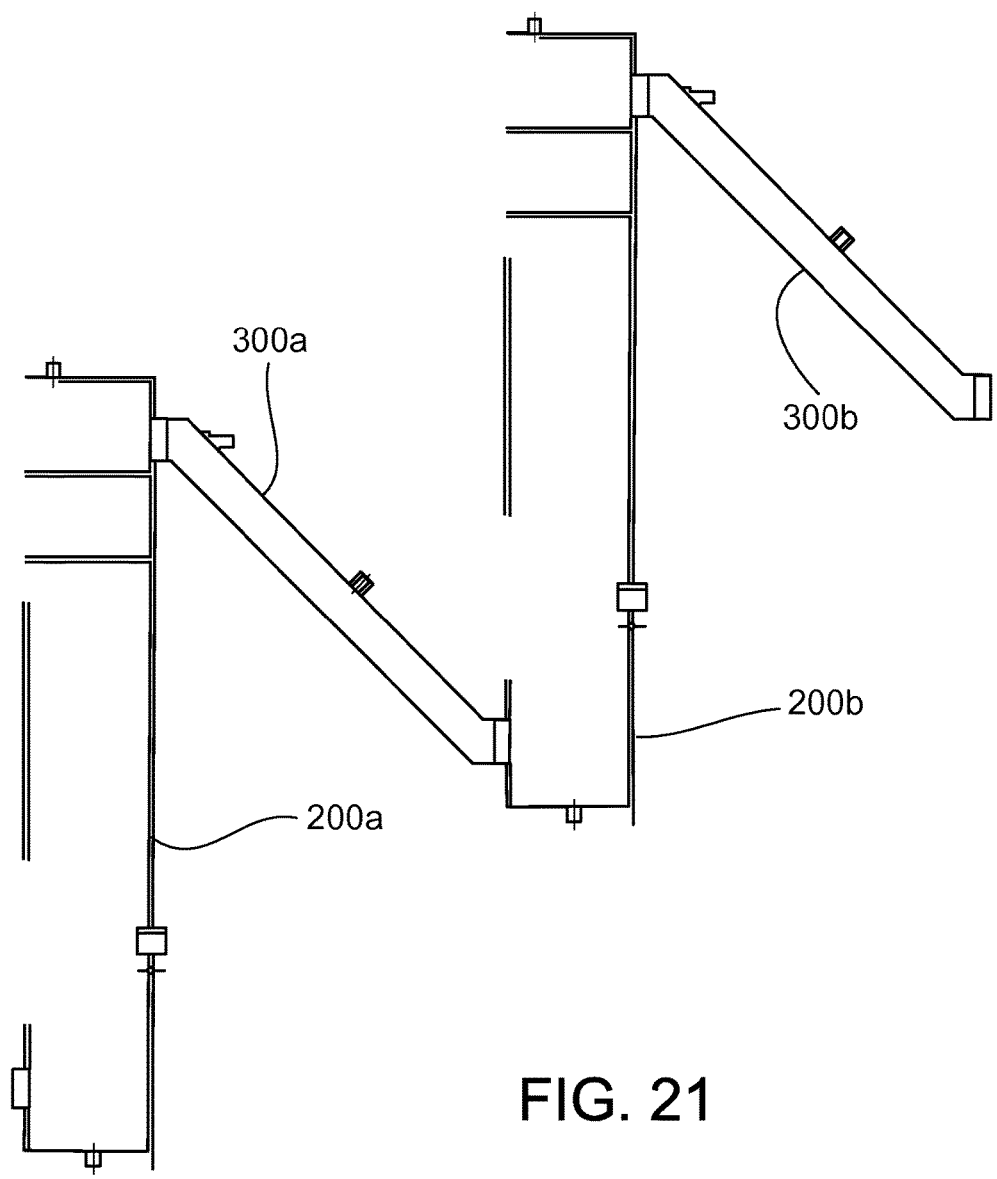
FIG. 21 is a cross-sectional view of reactor modules of the liquid enclosing system of FIG. 15.

Referring now to FIGS. 20 and 21, the reactor module 200a includes a reservoir section 202, a transfer section 204, and a removal section 206. As described in further detail below, the combined flow of the first fluid and the second fluid is at least partially interrupted by the flow controller 114 (FIGS. 16 and 18) such that a discrete volume of the combined first fluid and second fluid moves from the fluid delivery apparatus 100, into a reactant 201 in the reservoir section 202 to form a fluid container 209 (e.g., the second fluid enclosed in a membrane at least partially formed by the first fluid). The fluid container 209 is moved to the transfer section 204, removed from the reactor module 200a through the removal section 206, moved through the outlet conduit 300a and into the reactor module 200b, where the fluid container 209 may undergo a second process (e.g., rinsing, drying, coating, and/or placement in a biodegradable (e.g., poly-lactic acid) container. As described above, the reactor module 200 and the outlet conduit 300 are modular such that the fluid enclosing system 10 may be arranged to include additional processes through the addition of a corresponding number of reactor modules 200 and/or outlet conduits 300.

A reactant source 208 is in fluid communication with the reservoir section 202 such that the reactant 201 from the reactant source 208 can be moved by a pump 207 into the reservoir section 202. The reactant source 208 can also be in fluid communication with the removal section 206 such that excess reactant (e.g., reactant that does not react with the first fluid of the fluid container 209) can be returned to the reactant source 208 to reduce, for example, the amount of reactant required to create fluid containers 209. The reactant 201 can be, for example, a calcium chloride ($CaCl_2$) solution to facilitate hardening of the first fluid into a membrane substantially surrounding the second fluid.

The fluid delivery apparatus 100 is disposed toward a side of the reservoir section 202 substantially opposite the transfer section 204 to facilitate exposure of the discrete volume of combined first fluid and second fluid to the reactant 201 over a time sufficient to allow the first fluid to form a substantially hardened membrane substantially enclosing the second fluid therein to form the fluid container 209. In some embodiments, the time from the introduction of the of the discrete volume of combined first fluid and second fluid to the time of transfer of the formed fluid container 209 is about 1 s to about 300 s, e.g., about 60 s.

The fluid container 209 moves through the reactant 201 in a direction from the fluid delivery system 100 toward the transfer section 204. In some embodiments, this movement of the fluid container 209 due at least in part to the introduction (e.g., pumping) of reactant into the reservoir section 202, near the fluid delivery apparatus 100, such that a current is induced in the reactant 201 in the reservoir section 202. Additionally or alternatively, the fluid container 209 can be buoyant with respect to the reactant 201 such that air bubbles can be introduced into the reservoir section 202, near the fluid delivery apparatus 100, and the air bubbles carry the fluid container 209 toward the transfer section 204.

Figure 22A:
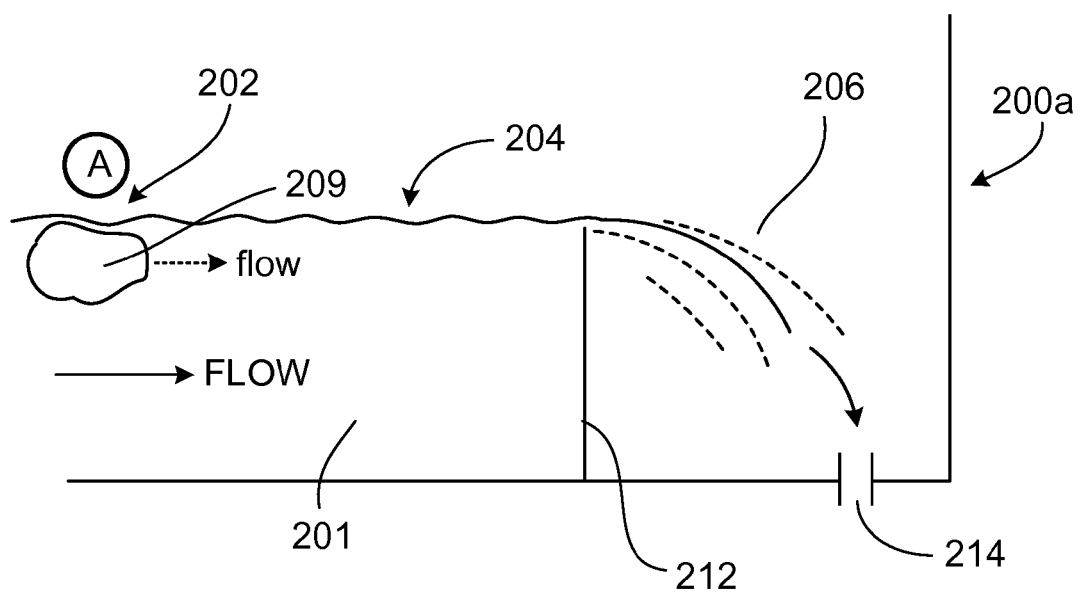
FIGS. 22A, 22B, and 22C are a schematic representation of a method of operating the reactor modules of FIG. 15.
Figure 22B:
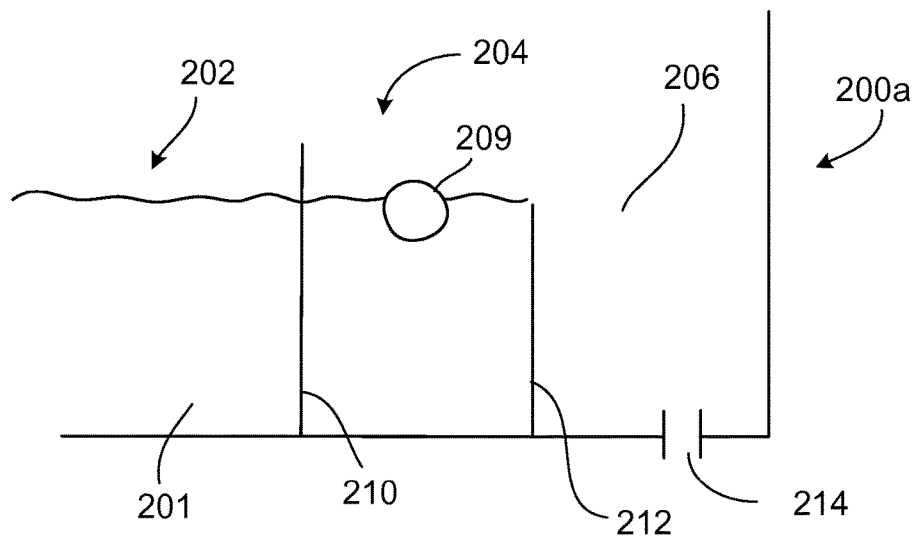
Figure 22C:
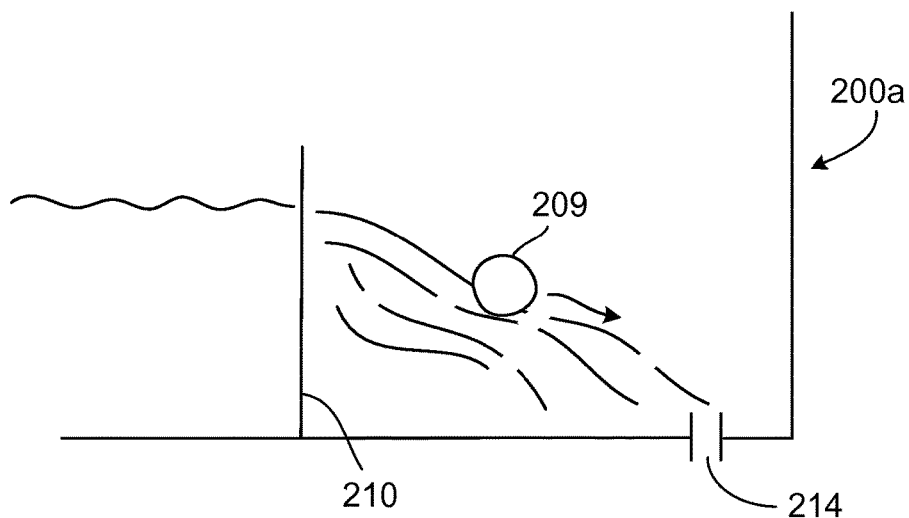

Referring now to FIGS. 22A, 22B, and 22C, a first lock 210 separates the reservoir section 202 from the transfer section 204, and a second lock 212 separates the transfer section 204 from the removal section 206. The first lock 210 and the second lock 212 are each independently movable between a first (e.g., down) position and a second (e.g., up) position. The movement of the first lock 210 and the second lock 212 relative to one another can, for example, limit loss of the reactant 201 as the fluid container 209 advances through the reactor module 200a. The first lock 210 can be taller than the second lock 212 to facilitate the removal of the fluid container 209 from the reactor module 200 without damaging the fluid container 209. The movement of the first lock 210 and/or the second lock 212 can be controlled to move the fluid container 209 through the reservoir section 202 (e.g., by inducing a current in the reactant 201 moving from the fluid delivery apparatus 100 toward the transfer section 204.

As the fluid container 209 moves from the reservoir section 202 toward the transfer section 204, the first lock 210 is removed from the flow path of the fluid container 209 such that the fluid container 209 may float on the reactant 201 and into the transfer section 204. With the fluid container 209 and the reactant 201 in the transfer section, the first lock 210 is moved to substantially separate the reservoir section 202 from the transfer section 204. The second lock 212 can be moved to allow the reactant 201 and the fluid container 209 to flow into and fill the removal section 206. The reactant 201 can reduce the forces imposed on the fluid container 209 as it moves from the transfer section 204 to the removal section 206. For example, the reactant 201 can act as a cushion as the fluid container 209 moves from a higher level in the transfer section 204 toward a lower level in the removal section 206.

The removal section 206 defines a drain 214 toward a lower portion (e.g., the bottom surface) of the reactor module 200. In the removal section 206, the movement of the reactant 201 toward the drain 214 also moves the fluid container 209 toward the drain such that both the reactant 201 and the fluid container 209 move through the drain 214. The drain 214 is sized to be larger than the largest dimension of the fluid container 209 to reduce the likelihood that the fluid container 209 could become stuck in the drain 214. In some embodiments, the reactant 201 and the fluid container 209 move toward the drain 214 under the force of gravity and/or under the force of the flowing reactant 201.

Referring again to FIGS. 20 and 21, the drain 214 is coupled to the outlet conduit 300a. During use, the fluid container 209 and reactant 201 exit the drain 214 and move through the outlet conduit 300a, toward the reactor module 200b, substantially under the force of gravity. The reactant 201 flowing through the outlet conduit 300a drains into return line 215 and is returned (e.g., pumped) to the reactant source 208. In some embodiments, the return line 215 transfers substantially all of the reactant 201 from the outlet conduit 300a to limit the amount of reactant 201 that moves into the reactor module 200b.

The outlet conduit 300a includes a first connecting section 302 and a second connecting section 304 disposed at either end of a main section 306. The outlet conduit 300a can facilitate separation of the fluid container 209 from the reactant 201 with minimal transfer of fluid from the reactor module 200a to a downstream process (e.g., a process in reactor module 300b). Additionally or alternatively, the outlet conduit 300a can facilitate delivery of the fluid container 209 into a new medium with minimal damage to the fluid container 209.

A channel 308 extends along the outlet conduit 300a from the first connecting section 302 to the second connecting section 304. The channel 308 can define one or more orifices (e.g., for fluid communication with the return line 215) sized to allow the reactant 201 to drain from the outlet conduit 300a before reaching the reactor module 200b but retaining the fluid container 209 in the outlet conduit 300a.

When the outlet conduit 300a is mounted between the reactor module 200a and the reactor module 200b, the first connecting section 302 and the second connecting section 304 are each substantially vertically oriented. This vertical orientation can facilitate, for example, connection of the outlet conduit 300a to the reactor module 200a and the reactor module 200b. Additionally or alternatively, the return line 215 can be in fluid communication with the outlet conduit 300a at the end of the vertically oriented first connecting section 302 such that the reactant 201 moving through the outlet conduit 300a can move into the drain line 215 under the force of gravity. In some embodiments, multiple return lines 215 are in fluid communication with the outlet conduit 300a to facilitate removal of the reactant 201 prior to the reactor module 200b. Additionally or alternatively, the drain capacity of the outlet conduit 300a and/or the return line 215 is greater than or equal to the flow of reactant 201 passing through locks 210 and 212 and into the removal section 206. For example, the drain capacity of the outlet conduit 300a and/or the return line 215 can be greater than or equal to the volume of reactant 201 held between the first lock 210 and the second lock 212 during movement of the fluid container 209 through the reactor 200a.

The second connecting section 304 can be coupled to a top portion of the reactor module 200b such that the fluid container 209 moving through the outlet conduit 300a can drop into the reservoir section 202 of the reactor module 200b. In some embodiments, the reservoir section 202 contains a volume of rinse fluid (e.g., water) to remove excess material from the fluid container 209. The fluid container 209 can move through the reactor module 200b in a manner analogous to that described above with respect to the reactor module 200a.

Figure 23:
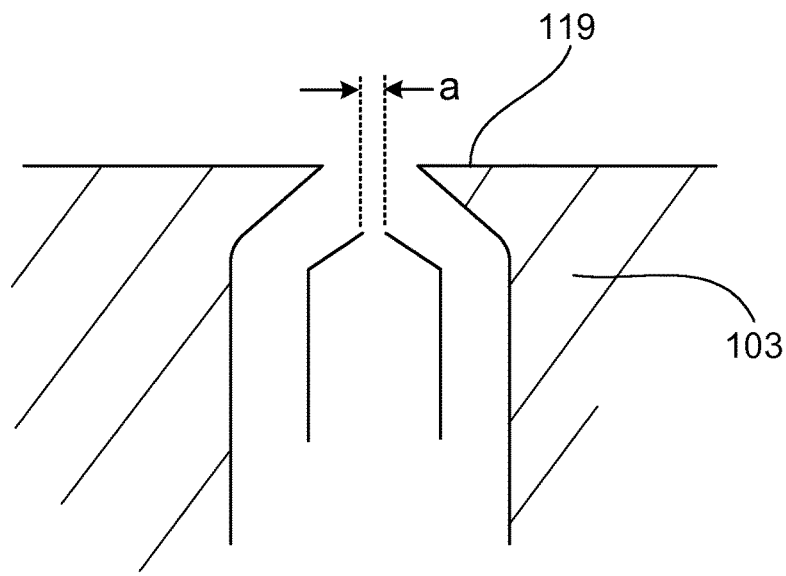
FIG. 23 is partial cross-sectional view of an embodiment of a fluid delivery apparatus.

For example, while the first housing 102 has been described as having a substantially uniform cross-section along its length, other embodiments are possible. Referring to FIG. 23, for example, a first housing 103 can include a substantially frusto-conical first outlet portion 119. This substantially frusto-conical first outlet portion 119 can, for example, increase the speed of the combined first fluid and second fluid exiting the first outlet portion 119.

Figure 24:
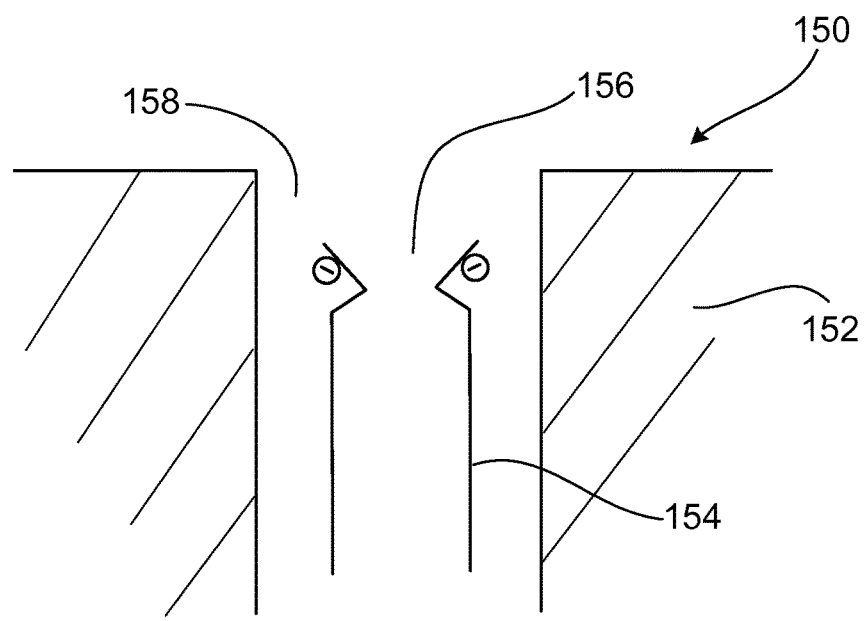
FIG. 24 is a partial cross-sectional view of an embodiment of a fluid delivery apparatus.

As another example, referring to FIG. 24, a fluid delivery system 150 can include a first housing 152 and a second housing 154 disposed substantially within the first housing 152. The second housing 154 can include an electrically polarized surface. The cross-sectional area of the second housing 154 can be larger (e.g., wider) as compared to a housing that does not include an electrically polarized surface.

In some embodiments, the charge on an electrically polarized surface can be transferred to one or both of the first fluid and the second fluid. In certain embodiments, an alternating current can be used to electrically polarize a surface of the first housing 152 and/or the second housing 154. Alternating the current at a range of frequencies can increase the diffusion of the second fluid and/or increase diffusion of ions within the second fluid into the first fluid. Such increased diffusion can, for example, result in faster hardening/curing of a membrane thus, for example, reducing the residence time required to form the fluid bottle 209 in the reactor module 200a. Additionally or alternatively, the amplitude of the frequency oscillation can also be varied. Such variation in amplitude can, for example, be used to control the thickness of the membrane of the fluid container 209.

As still another example, while second housing 154 has been described as including an electrically polarized surface, the first housing 152 may additionally or alternatively include an electrically polarized surface.

As yet another example, while alternating current has been described as being applied to at least one of the first housing 152 and the second housing 154, other embodiments are possible. For example, an alternating current can be applied to a reactant disposed in the reactor module 200a.

As yet another example, many of the physical and/or chemical properties that will define a fluid container made by a fluid enclosing system may depend on the ratio of various dimensions of a fluid delivery apparatus. Examples of physical and/or chemical properties that may depend on relative dimensions of the fluid delivery apparatus include: the ratio of the membrane thickness to the interior volume of the fluid container; uniformity of hardening and/or curing of the membrane; thickness of the hardened and/or cured portions of the membrane versus unhardened and/or uncured portions of the membrane; density or other physical properties that might facilitate shearing the combined flow of the first fluid and the second fluid through a flow controller; and diffusion of a reactant (e.g., calcium) which may impact the quality of the membrane of the fluid container and/or the quality of the liquid contained within the membrane.

Figure 25:
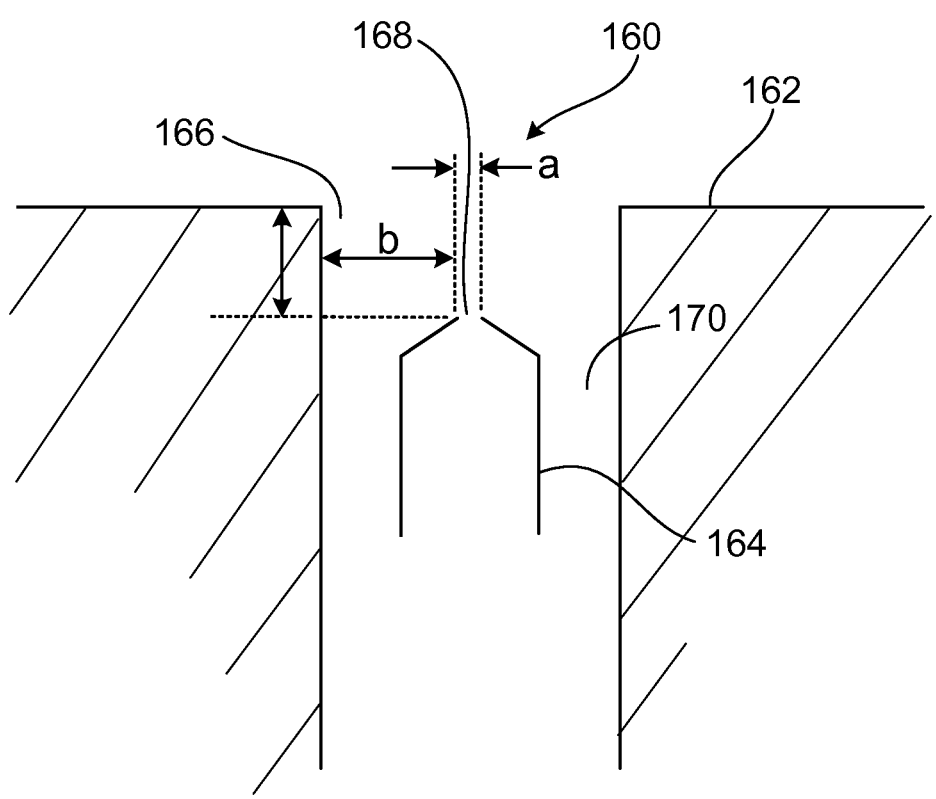
FIG. 25 is a partial cross-sectional view of an embodiment of a fluid delivery apparatus.

For example, referring to FIG. 25, a fluid delivery apparatus 160 includes a first housing 162 and a second housing 164 disposed substantially within the first housing 162. The first housing 162 and the second housing 164 each define respective outlet orifices 166 and 168. Variation of the ratio of the first outlet orifice 166 to the second outlet orifice 168 (e.g., by varying a dimension "a" of the second outlet orifice 168) can result in variation of the physical and/or chemical properties of the fluid container.

The second orifice 168 is set upstream of the first orifice 166 such that a second fluid can move through the second orifice 168 into a first fluid flowing in a first fluid passage 170 at least partially defined by the first housing 162. In some embodiments, a distance "c" between the first orifice 166 and the second orifice 168 is varied to change the physical and/or chemical properties of the fluid container.

The second orifice 168 is arranged at a distance "b" from the first housing 162. In some embodiments, the distance "b" is varied to change the physical and/or chemical properties of the fluid container.

As yet another example, while the flow controller 114 has been described as at least partially interrupting a substantially continuous flow of the combined first fluid and second fluid moving out of the top portion 130 of the housing 128, other embodiments are possible. For example, referring still to FIG. 25, one or more dimensions of the first housing 162 and/or the second housing 164 may be varied to create discrete fluid segments for introduction into reactor module 200a. Additionally or alternatively, the flow rate of the first fluid and/or the second fluid moving through the respective first housing 162 and second housing 164 may be varied (e.g., pulsed) to create discrete fluid segments for introduction into reactor module 200a.

Example 8—System for Enclosing Foods in a Natural Transport System

We demonstrated a prototype mechanized process for producing the edible bottles based on the methodology described in the previous examples. As shown in FIG. 27, the prototype system 600 included movable cars 610 mounted on a guide path (e.g., rails) 612. The movable cars 610 were configured to transport an ice-cube sized object approximately along the guide path 612. The prototype was tested using frozen liquids such as water, orange juice, pomegranate juice, cranberry juice, strawberry juice, pear juice, multi-fruit juice. Other frozen liquids, or solids, could be coated using the prototype system 600. In some instances, juices had to be diluted so as to facilitate their freezing into a firm solid. For example, strawberry juice was diluted with water to enable spherical "ice-cubes" of strawberry juice to be readily prepared in (and, without breakage, removed from) molds placed in a freezer.

The guide path 612 extended through two reservoirs 614, 616. The first reservoir 614 contained an alginate solution and the second reservoir 616 contained a calcium chloride solution as described in the previous examples. It is anticipated that some embodiments of the system will include more reservoirs and/or the reservoirs can be used to hold other solutions. For example, some systems can include a reservoir containing liquid nitrogen, and a reservoir containing alginate (possibly with food particles), a reservoir containing calcium chloride or magnesium chloride, a reservoir containing a coating wax, and/or a reservoir containing water for rinsing the coated cube.

The prototype system 600 also included two conveyor belts (or track "chains") 618, 620. Each reservoir is associated with a separate conveyor belt to limit cross-contamination between reservoirs. Systems with more reservoirs containing different solutions typically also include more conveyor belts. The conveyor belts 618, 620 in the prototype system 600 were operated by electric motors 622, 624 powered by 12 V batteries.

In the prototype system 600, the movable cars 610 were two-piece articulated cars with the first section 626 connected to a second section 628 by a coupling 630. The first and second sections 626, 628 each include a base configured to engage the guide path 612. The first section 626 includes a resilient member (e.g., a fixed metal bar, spring member, etc.) 632 biased towards the second section 628. The second section 628 includes a cup shaped member sized to receive the cube being coated. The cup shaped member of the second section 628 defines drain holes (not shown) that allow solution to escape the cup shaped member and drain back, for example into the appropriate reservoir.

Having a two-piece movable car as in this prototype system has several advantages. For example, there may be specific points along the guide path 612 where a conveyor belt cannot be in contact with a base component of movable car 610. Having two sections 626 and 628 permits one section to continue to be in contact with the conveyor belt even if the other is over a section where contact with the conveyor belt is impossible. This allows, for example, section 628 to "push" section 626 forward as the movable cars 610 move up and out of reservoir 614, since in one embodiment of system 600 tested, conveyor belt 618 passes under a guiding rod at a point near the exit of guide path 612 from reservoir 614, and at this specific point contact between both movable cars of 610 simultaneously is not possible. This particular feature of the embodiment of system 600 tested also requires that the coupling 630 be of a rigid material.

In operation of the prototype system 600, the object to be coated was manually placed in the movable car 610. Possible automated loading systems are discussed below in the description of FIGS. 29A and 29B. Engagement of the movable car 610 by the conveyor belt 618 draws the movable car 610 up the initial rise in the guide path 612. As this occurs, the object to be coated drops into the cup shaped member of the second section 628 of the movable car 610. As the movable car 610 descends into the first reservoir 614, the object to be coated falls forward to engage the resilient member 632 on the front section 626 of the movable car 610. If the specific gravity of the object to be coated is less than the specific gravity of the solutions in the reservoirs, the object floats free of the base of the movable car 610 as the movable car passes through the reservoirs. This configuration increases likelihood that the entire exterior surface of the object being coated is exposed to the solution contained in the first reservoir. In some cases, the cup shape of 628 helps force the object to be coated into the liquid. The cup shaped member and the resilient member 632 of the movable car 610 cooperate to contain the object being coated and keep it from floating away, while also permitting it to be covered to a large extent on all sides by the fluid of the reservoir. The shape, size, rigidity, etc. of coupling 630 plays a role in the relative motions and positions of sections 626 and 628, to help enable this cooperation. The length of the guide path 612 and the speed of the car 610 can be adjusted to control the amount of time the object being coated spends in a specific reservoir. For example, motor 622 can be programmed to halt movement of conveyor belt 618 when movable car 610 is in reservoir 614, thus extending the time over which the object to be coated remains in contact with the fluid in reservoir 614.

As the movable car 610 lifts the object being coated out of the first reservoir 614, excess solution drains off of the object and movable car 610 through the drain holes defined in the cup shape of the second section 628 of the movable car 610. Moving along the guide path, the movable car 610 disengages from the first conveyor belt 618 and engages the second conveyor belt 620. The sequence is repeated with the second reservoir 616. After leaving the second reservoir 616, the guide path and, thus, the movable car 610 was inverted to release the coated object from the movable car 610. In this sample embodiment, the guide path 612 allows the movable car 610 to advance by gravity alone after disengaging from conveyor belt 620. This is facilitated by the natural motion of the object to be coated from section 628 to 626 due to the slant of the guide path 612, which further propels movable car 610 forward by momentum.

It should be noted generally that the two sections 628 and 626 of movable car 610 have been designed, in this sample embodiment, to facilitate transport and coating of the object with a simple design and no mechanized parts. In other embodiments, a single-car system could be used with a mechanized open/close door function, to allow for contact with reservoir fluid, retrieval of the object for transport to the next reservoir, etc.

This prototype demonstrated the possibility of industrial production of the edible bottles based on the methods described previously. Placed in a controlled sterile environment, the mechanized system can be configured to produce between 100 and 300 edible bottles per hour. Production can increase through the use of multiple rails, motors, and ice producing machines.

FIG. 29A is a schematic of a system 633 for coating objects to form natural transport systems that is substantially similar to the system 600. However, system 633 includes three reservoirs and a loading module 634. The loading module 634 includes an ice machine 636 and a loader 638. The loader 638 includes radial compartments which rotate about an axis 640 and is disposed above the guide path 612. The ice machine 636 produces frozen "cubes" (e.g., ice cubes or cubes of frozen juice) that, instead of falling into an internal reservoir as is typical of ice production machines, are guided to slide out along a chute that brings the frozen cubes to the loader 638 (see FIG. 29B(1)). As used herein, cube is used in the sense that ice machines are understood to make ice cubes rather than to indicate a specific geometric shape. In some embodiments, the frozen material being coated is formed in other shapes. The loader 638 is able to accept one cube at a time, in one compartment (see FIG. 29B(2)). A moveable car 610 contacts and rotates the loader 638 such that the ice cube falls out of the radial compartment and into the moveable car below (see FIGS. 29B(4) and 29B(4)). Approximately simultaneously, another ice cube can load into the wheel, in preparation for a future passage of another moveable car.

Other Embodiments

A number of embodiments have been described. Nevertheless, it will be understood that various modifications may be made without departing from the spirit and scope of the invention.

For example, food transport systems can also be formed by spraying droplets of food liquid from a tube with an annulus around the tube that sprays an enveloping membrane material. In one embodiment, the tube sprays water containing calcium and the annulus sprays chemically-modified alginates as described above. When the droplets come out of the tube covered with the membrane, the droplets are exposed to UV light and possibly suspended in the air for some period of time to be allowed to harden.

In another example, the droplets may be sprayed with just a sodium alginate membrane and, in the air, coated with the chemically modified alginates as described above. The droplets would then be exposed to UV light and possibly suspended in the air for some period of time to be allowed to harden.

In another example, the droplets may be sprayed with a sodium alginate membrane and, in the air, hardened/cured with calcium as described above.

In some embodiments, containers include a PLA outer shell and use inner membranes ranging from the sodium alginate membranes to edible waxes of the kinds used on fine chocolates occasionally. The latter have a distinct advantage of repelling water. Some embodiments may contain one or more combinations of such materials as "shells" or "membranes", for example, a sodium alginate membrane, hardened/cured with calcium, may be covered with an edible wax and then placed within a PLA shell.

Figure 14:
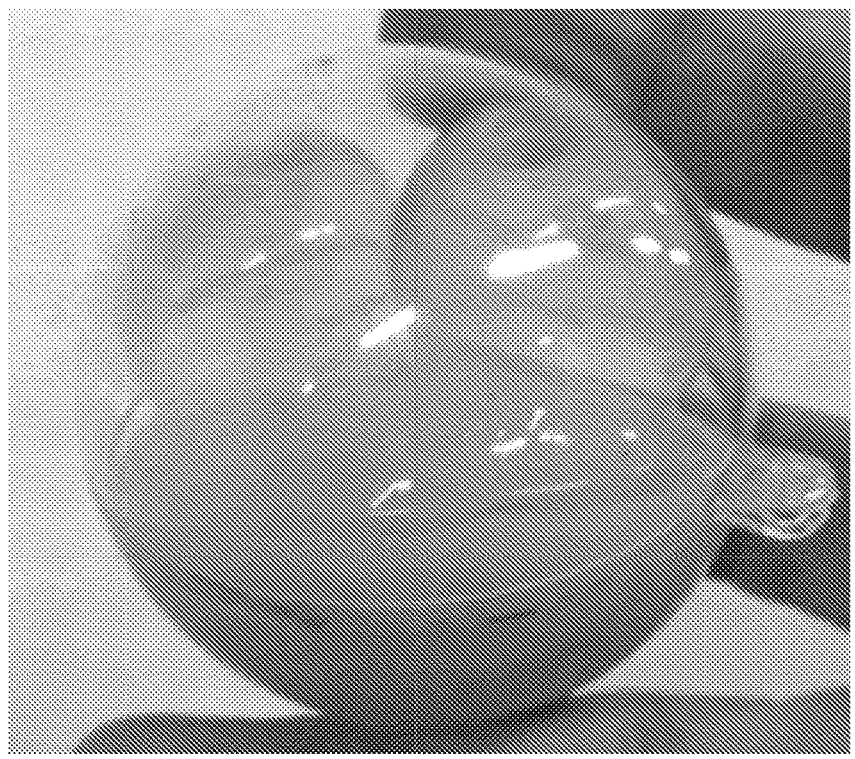
FIG. 14 is a photograph of a shell of PLA filled with multiple liquid-containing membranes.

In some embodiments, multiple inner containers can be protected by a single outer shell. For example, FIG. 14 shows a shell of PLA filled with 'grapes' of liquid and closed up like a bottle. The outer shell can be opened and the 'grapes' consumed with the liquid they contain. The outer shell is biodegradable and the advantage of the inner membranes is to reduce direct contact of water bottle and water and therefore avoid degradation of the bottle itself.

Accordingly, other embodiments are within the scope of the following claims.

What is claimed is:

1. A system for storage and delivery of a potable substance, the system comprising:
    a potable substance;
    a manufactured inner membrane encapsulating the potable substance, and wherein the manufactured inner membrane comprises a polysaccharide polymer and/or an edible wax and is at least partially impermeable to the potable substance; and
    a manufactured outer shell encapsulating the manufactured inner membrane, wherein the manufactured outer shell is more impermeable and/or has higher strength and/or is more stable than the manufactured inner membrane,
    wherein the manufactured inner membrane is in contact with the manufactured outer shell.

2. The system of claim 1, wherein the polysaccharide polymer is selected from the group comprising an alginate and a gellan gum.

3. The system of claim 1, wherein the manufactured inner membrane comprises edible particles and a charged polymer charge cross-linked by multivalent cations, including cross-linking interactions between particles and alginates via bridges formed by the multivalent cations.

4. The system of claim 1, wherein the manufactured outer shell is biodegradable and/or edible.

5. The system of claim 1, wherein the manufactured outer shell comprises crosslinked copolymer.

6. The system of claim 1, wherein the manufactured outer shell comprises polylactic acid.

7. The system of claim 1, wherein the potable substance comprises a liquid selected from the group consisting of water, alcohol, juice, a carbonated beverage, and combinations thereof.

8. The system of claim 1, wherein the potable substance is at least one of a gel, an emulsion, and a foam.

9. A method comprising:
    coating a cooled potable substance in a manufactured inner membrane that is at least partially impermeable to the potable substance when at room temperature, wherein said inner membrane encapsulates the potable substance, and comprises a polysaccharide polymer and/or an edible wax; and
    coating the first inner membrane in a manufactured outer shell that is structurally stable at room temperature, wherein the manufactured outer shell encapsulates the manufactured inner membrane, and is more impermeable and/or has higher strength and/or is more stable than the manufactured inner membrane;

wherein the manufactured inner membrane is in contact with the manufactured outer shell.

10. The method of claim 9, further comprising cooling the potable substance to a temperature below about 0 degrees centigrade.

11. The method of claim 9, wherein cooling the potable substance comprises cooling the potable substance in liquid nitrogen, particularly wherein the cooling of the potable substance comprises freezing the potable liquid into a mold before applying liquid nitrogen to the frozen liquid.

12. The method of claim 9, wherein coating the cooled potable substance in the manufactured inner membrane comprises coating with a polysaccharide polymer.

13. The method of claim 9, wherein coating the cooled potable substance in the manufactured inner membrane in a manufactured outer shell that is structurally stable at room temperature comprises coating with at least one of a calcium layer and a cross-linked polymer layer.

14. A system of a potable substance within a module for storage and delivery of the potable substance, the system comprising:
   a potable substance;
   a manufactured inner membrane at least partially impermeable to the potable substance, the inner membrane encapsulating the potable substance; and
   a manufactured outer shell having different properties than the manufactured inner membrane, the manufactured outer shell encapsulating the manufactured inner membrane, wherein the manufactured inner membrane and manufactured outer shell are biodegradable and/or edible, wherein the manufactured inner membrane comprises a polysaccharide polymer and/or an edible wax, and is in contact with the manufactured outer shell.

15. The system of claim 14, wherein the polysaccharide polymer is selected from the group comprising an alginate and a gellan gum.

16. The system of claim 14, wherein the manufactured inner membrane comprises edible particles and a charged polymer charge cross-linked by multivalent cations, including cross-linking interactions between particles and alginates via bridges formed by the multivalent cations.

17. The system of claim 14, wherein the manufactured outer shell comprises crosslinked copolymer.

18. The system of claim 14, wherein the manufactured outer shell comprises polylactic acid.

19. The system of claim 14, wherein the potable substance comprises a liquid selected from the group consisting of water, alcohol, juice, a carbonated beverage, and combinations thereof.

20. The system of claim 14, wherein the potable substance is at least one of a gel, an emulsion, and a foam.

* * * * *